United States Patent [19]

Peckels

[11] Patent Number: 5,507,411
[45] Date of Patent: Apr. 16, 1996

[54] ELECTRONIC DISPENSING HEADS

[75] Inventor: Arganious E. Peckels, Ogilvie, Minn.

[73] Assignee: Berg Company, a division of DEC International, Inc., Madison, Wis.

[21] Appl. No.: 470,797

[22] Filed: Jun. 6, 1995

Related U.S. Application Data

[60] Division of Ser. No. 143,567, Oct. 26, 1993, which is a continuation-in-part of Ser. No. 672,054, Mar. 18, 1991, Pat. No. 5,255,819, which is a continuation-in-part of Ser. No. 477,553, Feb. 9, 1990, Pat. No. 5,044,521.

[51] Int. Cl.⁶ ..................................... B67D 5/22
[52] U.S. Cl. ........................ 222/1; 222/23; 222/641
[58] Field of Search ..................... 222/1, 14, 23, 222/25–28, 30, 36, 37, 39, 640, 641

[56] References Cited

U.S. PATENT DOCUMENTS

| | | | |
|---|---|---|---|
| Re. 31,434 | 11/1983 | Reilly | 222/641 X |
| 3,170,597 | 2/1965 | Reichenberger | 222/36 |
| 3,257,034 | 6/1966 | Dumm, III | 222/36 |
| 3,321,113 | 5/1967 | Corny | 222/477 |
| 3,647,115 | 3/1972 | McCann et al. | 222/39 |
| 3,688,947 | 9/1972 | Reichenberger | 222/27 |
| 3,845,883 | 11/1974 | Johnson et al. | 222/30 |
| 3,920,149 | 11/1975 | Fortino et al. | 222/1 |
| 3,993,218 | 11/1976 | Reichenberger | 222/30 |
| 4,034,757 | 7/1977 | Glover | 222/36 X |
| 4,278,186 | 7/1981 | Williamson | 222/36 |
| 4,433,795 | 2/1984 | Maiefski et al. | 222/14 |
| 4,436,223 | 3/1984 | Wilson | 222/36 |
| 4,660,742 | 4/1987 | Ozdemir | 222/641 X |
| 4,736,871 | 4/1988 | Luciani et al. | 222/641 X |
| 4,892,236 | 1/1990 | Griffiths et al. | 222/640 |
| 5,044,521 | 9/1991 | Peckels | 222/23 |
| 5,255,819 | 10/1993 | Peckels | 222/1 |
| 5,318,197 | 6/1994 | Martindale et al. | 222/30 X |
| 5,379,916 | 1/1995 | Martindale et al. | 222/30 X |

FOREIGN PATENT DOCUMENTS

| | | | |
|---|---|---|---|
| 0098042 | 1/1984 | European Pat. Off. | 222/36 |
| 3702104 | 8/1988 | Germany | 222/1 |

*Primary Examiner*—Andres Kashnikow
*Assistant Examiner*—Kenneth Bomberg
*Attorney, Agent, or Firm*—Quarles & Brady

[57] ABSTRACT

A liquid dispensing method and apparatus has a system with new individual dispensing heads connectible one each to a plurality of different liquid bottles, i.e. liquor, and a remote dispensing data receiver and computer that receives data from each head. Each head has structure for being secured to a bottle, a liquid bore and an air vent, and one or more of the following features and functions: an electronic dispensing timer, a stop pour annunciator, a magnetically latched dispensing control valve, an electronic bottle lock a radio transmitter and antenna, an electronic fractional pour annunciator, programmable dispensing control, a micro-processor computer, a data storage, a data I/O structure, and structure and function for uniquely electrically identifying each head and liquid. The recover/computer has a data receiver and has structure and function to electronically program each head, the computer provides a record of all important dispensing data including head connection to bottles, head numbers, liquid identities, quantities of dispense cycle, quantity of liquid dispensed, inventory status and other desirable business data. The annuciator equipped head has an interior light that illuminates the entire transparent or transluscent head.

7 Claims, 14 Drawing Sheets

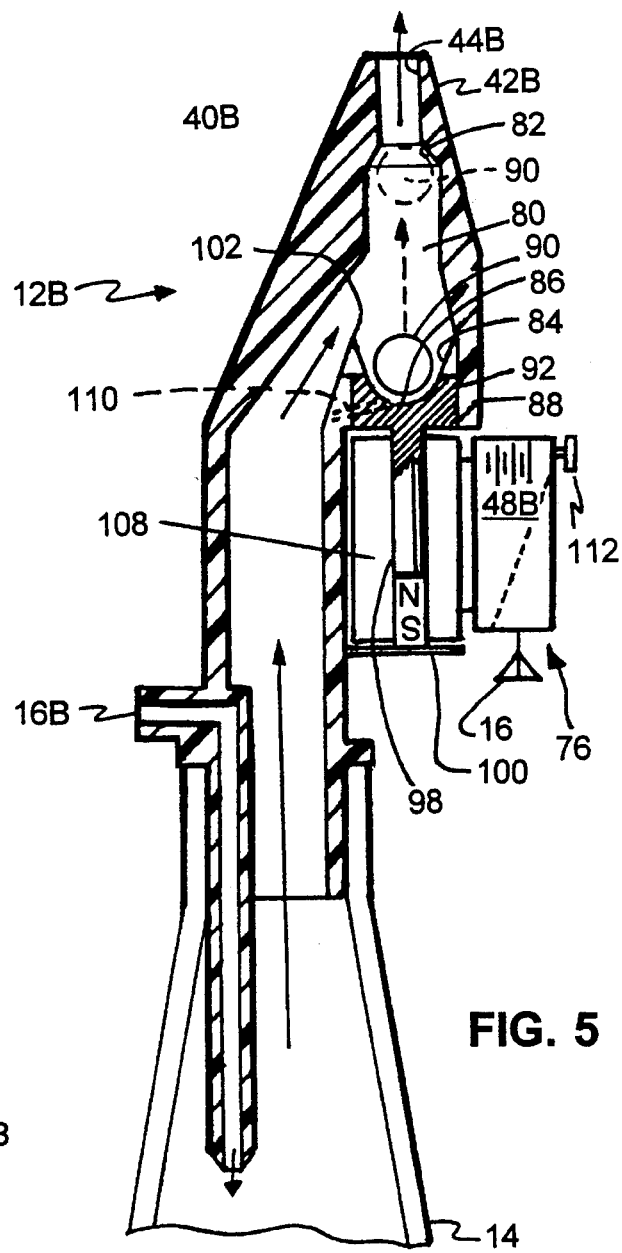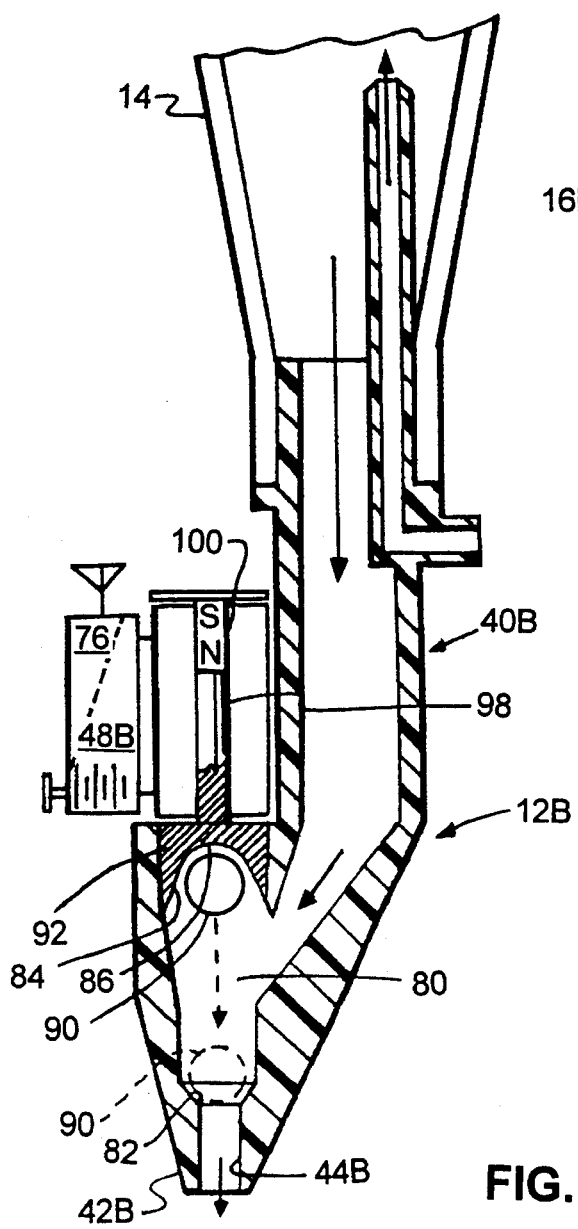
FIG. 5
FIG. 6

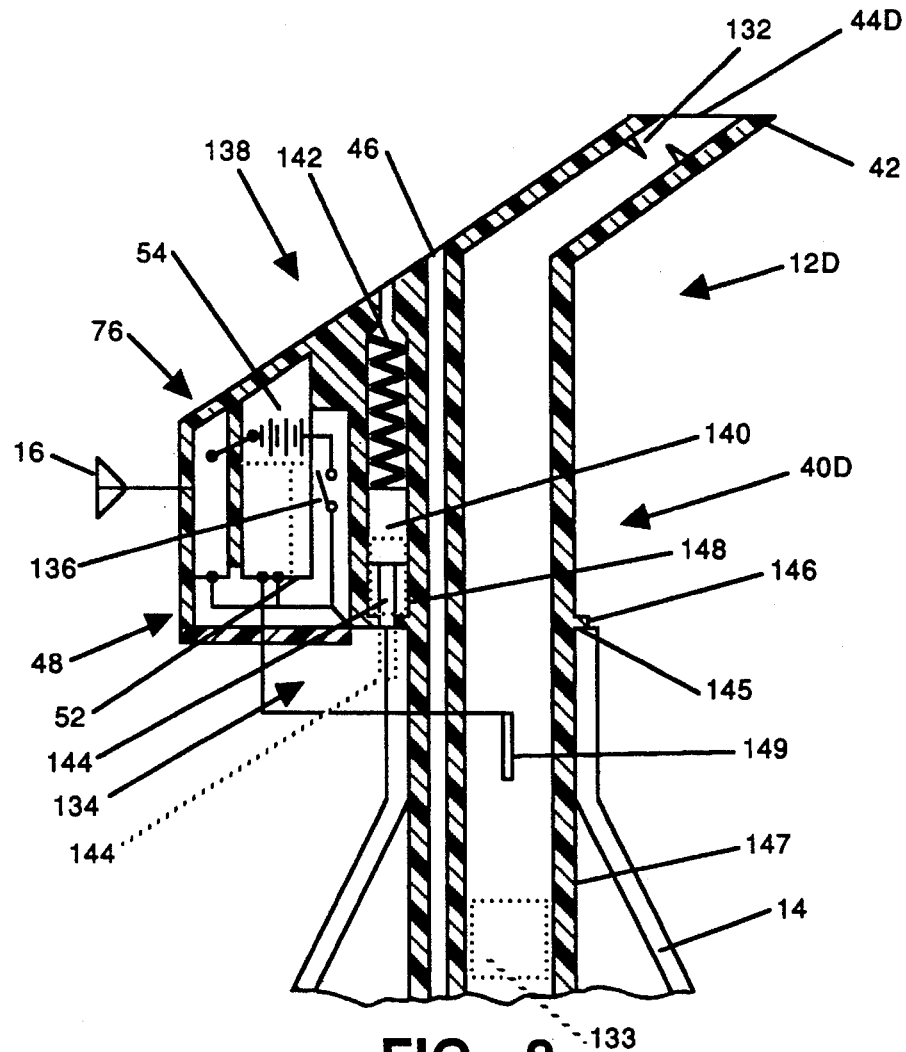
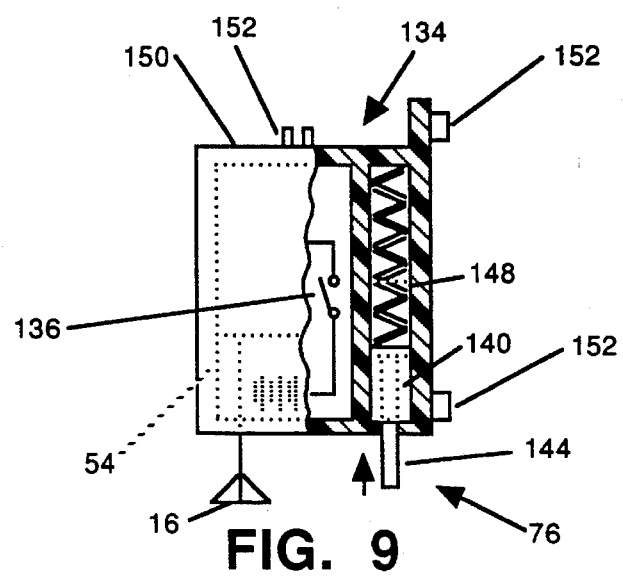

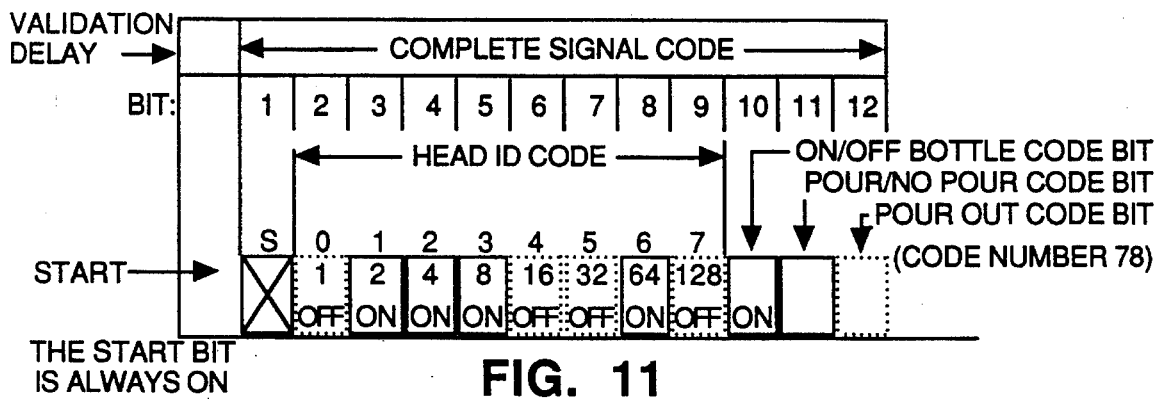
FIG. 11
1. HEAD OFF BOTTLE: TRANSMITTER DEAD
2. HEAD PLACED UPON BOTTLE; BIT TEN
3. LOAD BOTTLE CODE INTO COMPUTER AND ID TO SPECIFIC HEAD "XYZ"
4. START DISPENSE; BIT ELEVEN
5. STOP DISPENSE; BIT TEN
6. CALCULATION OF VOLUME DISPENSED RECORDING OF EVENT IN MEMORY
7. REPEAT STEPS 4, 5, AND 6
8. BOTTLE EMPTY; BIT TWELVE
9. HEAD REMOVED FROM BOTTLE; BIT ELEVEN OR TWELVE
FIG. 12A
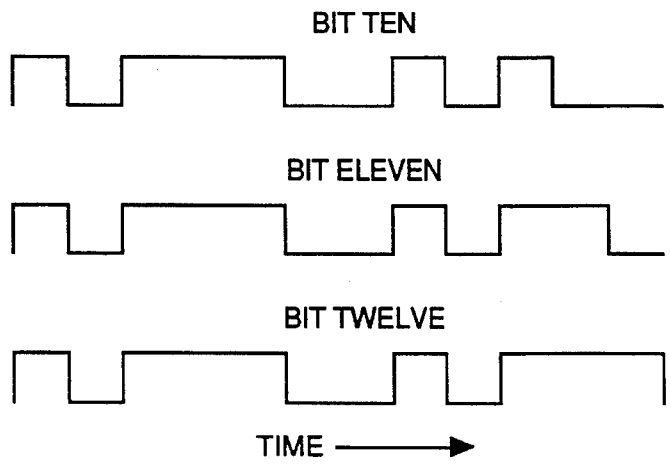
FIG. 12B

ELECTRONIC DISPENSING HEADS

RELATED APPLICATIONS

This is a divisional of Ser. No. 143,567 filed Oct. 26, 1993 which was a continuation-in-part of my U.S. Ser. No. 672,054 filed Mar. 18, 1991, now U.S. Pat. No. 5,255,819 which was a continuation-in-part of my U.S. Ser. No. 477,553 filed Feb. 9, 1990, now U.S. Pat. No. 5,044,521.

FIELD OF THE INVENTION

This invention pertains to a method and apparatus wherein new and improved dispensing heads are provided for manual dispensing from discrete vessels with electronic control either with or without at each vessel and remote recording of dispensing function data from each vessel.

The focus of this invention is methods, systems, and componentry for liquor and beverage dispensing by manual inversion of individual a bottles and a discrete electronic head on each bottle, and the provision of a new and improved dispensing head on each bottle. Each head may have a dispensing data transmitter in each head and a remote dispensing data receiver and computational device, with a new method and apparatus for the devisement and accumulation of the dispensing data.

THE PRIOR ART

There are many examples of liquor dispensing heads for individual bottles. An outstanding commercially successful device of this type is subject of Conry U.S. Pat. No. 3,321,113 which is sold under the trademark "POSI-POUR". The problem with these devices is that managers and employees cheat and short change the owners. The ball valve mechanism on Conry frequently gums up and the head has to be removed and washed out.

Complete and costly remote system such as those devised and patented by Joseph Shannon are one (and a costly) solution, but the bottles are remoted, the bartender entertainment element is lost, and the system is expensive and requires hard plumbing into the physical building.

Reichenberger U.S. Pat. No. 3,170,597 is a liquor dispensing system having dispenser heads which secure to individual bottles.

Reichenberger U.S. Pat. No. 3,170,597 is a method and apparatus for dispensing liquor wherein a plurality of individual dispensing heads mechanically secure and lock to individual liquor bottles for manual pour of the liquor, with a remote radio receiver and recorder receiving dispensing signals from a radio transmitter in each head.

The dispensing head has a mechanical lock structure that retains the head to the bottle for preventing cheating. Operation of the lock requires a conventional key and therefore a manager type individual has to remove and install the head from the bottle as each bottle is emptied, and replaced with a new full bottle. Operation of the lock device requires a time consuming partial disassembly and re-assembly of the head during removal and reinstallation. During dispensing operation with this system, it is apparent that a manager must oversee the replacement of bottles on the heads.

The Reichenberger bottle and head normally stand upright and are manually inverted for dispensing. The head has a battery and a mercury switch that causes the transmitter to emit a signal when the bottle and head are tilted to a dispensing position. The transmitter is arranged to emit an amplitude or pulse modulated signal, the rate of which may be determined by the liquor, so that the liquor flowing out will be measured in accordance with the number of beeps or pulses sent out by the transmitter to the receiver during the flow of liquor. Reichenberger states that inasmuch as liquor flows at a given rate through a given size spout, a certain number of beeps or pulses will be transmitted and received and the particular number of beeps will indicate and record accurately the mount of liquor dispensed. The radio receiver and recorder may be provided with various counting and recording mechanisms common to the electronic receiver art. The intention of this system is to establish a record of all materials dispensed from the bottles.

A second embodiment of Reichenberger combines a conventional positive displacement volumetric single or double jigger measuring chamber device (that is assumed to be in the head) with a transmitter that emits a single signal in accordance with the closing of the switch to indicate dispensation of one chamber volume of liquid.

I have found that Reichenberger's teachings are extremely speculative, that these bottle head dispensers do not operate as he indicates, and have come to the conclusion that his patent is probably a concept on paper.

Firstly, I have found that the liquor does not flow at a given rate through a given size spout. The flow rate varies considerably during a dispensing period; specifically when the bottle and head are inverted, the flow rate starts slowly and increases and then falls off as an air vent and vacuum in the bottle, and the height of the beverage in the bottle eventually stabilize the flow rate. As a specific example, if a single shot of liquor is dispensed, beeps will be produced. However, if two or more shots are dispensed during a single inversion of the bottle, 2 beeps will not be produced because the flow rate increases during the dispensing and the second unit of liquor flows faster than the first unit. Further, the dispensing of three, four, five or six shots, as an example, will not produce 3, 4, 5 or 6 beeps. There is no recognition or compensation in the Reichenberger method or apparatus for the relatively slow flow rate during the start-up of dispensing and the relative increase in flow rate as dispensing continues.

There is no function or structure in Reichenberger for different dispensing techniques by different people, or for different techniques in different businesses.

There is no function or structure for variations in flow rate between different beverages. For example, a high alcohol low Brix liquor like vodka flows very fast whereas a high Brix liquor such as the expensive cremes and flavored liqueurs flow relatively slowly.

There is no function or structure for identifying which beverage has been dispensed. As an example, there may be 100 different liquors. Which one was poured?

There is no function or structure for count of bottles brought on and bottles empties. How does an owner determine than an entire bottle did not vanish?

There is no function or structure for inactivation of the transmitter during removal from the bottle. For example, if the bottle and head, or head is/are inverted during removal and changing, signals will be sent to the receiver and provide inaccurate tally of dispensing. The head may not even be inverted for a water flush or wash. If the head could be inactivated, then it is relatively easy to cheat system.

There is no function or structure in Reichenberger to indicate the quantity dispensed, so the operator has to use an intermediate measuring vessel as shown in FIG. 3, with the Reichenberger preferred structure or method.

Further, an individual with a key can move the Reichenberger head from bottle to bottle, and can remove the head and replace the head and no record is made of these events. Dilution and/or substitution of dispensed beverage is unchecked. The manager can even give a key to an employee for purpose of defeating the accounting system.

The Reichenberger method and apparatus are totally dependent upon the manager(s) of the system, and in most retail establishments that are open for business on all days/evenings, there are several shift managers for each dispensing system. Further, this method and apparatus enables relatively long circumvention of proper tax payment on dispensed beverage. At the end of a business period, the Reichenberger's recorder may read "13,763" for example. What does this mean?—"13,763" what?

Further, in this type of bottle dispensing head, no one has ever de-vised a flow indicator in the head, or a valve device in a bottle dispensing head that may be selectively or automatically controlled to shut off dispensing. The only quantity devices have been position displacement chambers such as the single/double jigger device referred to by Reichenberger, and the dampener displacement control devices such as in Conry U.S. Pat. No. 3,321,113.

Another example of a recording dispenser for bottles is the subject of Wilson U.S. Pat. No. 4,436,223. Wilson has a bottle head that has a battery, a three digit count display, three RCA 4026 electronic chips to drive the display, and a pair of conductivity probes in the spout to sense the presence of conductive liquid in the spout. The display indicates the relative number of times that conductive liquid is present in the spout. The Wilson head for example will indicate "796" if it has had liquid in the spout 796 times. There is no provision for removal of the Wilson head from the bottle, or placement upon other bottles. With Wilson, an entire bottle can be emptied in a single pour and only indicate "001". The read can then be padded by holding the head under a faucet and turning the ? on and off, or by repeated immersion in and removal from a sink.

OBJECTS OF THE INVENTION

It is an object of this invention to provide new methods and apparatus for dispensing beverages from individual vessels, specifically bottles, with new and improved beverage dispensing heads and functions.

It is an object of this invention to provide new methods and apparatus for dispensing liquid from a plurality of discrete vessels, with distinguishing electronic identification of each liquid.

It is an object of this invention to provide new methods and apparatus for dispensing liquid from discrete vessels, with electronic program of individual dispensing heads on each vessel.

It is an object of this invention to provide new methods and apparatus for electronically coding identification of dispensing heads on plurality of liquid bottles.

It is an object of this invention to provide new methods and apparatus for providing business data from the dispensing of liquid from a plurality of bottles.

It is an object of this invention to provide new methods and apparatus for pouring liquid from bottles wherein a dispensing head on each bottle has a micro-computer which is programmable for the liquid in the bottle.

It is an object of this invention to provide new methods and apparatus for dispensing liquids from bottles, with adjustable dispensing stop signal structure and function being provided on each bottle.

It is an object of this invention to provide a new and improved methods and apparatus for dispensing liquid with manual dispensing directly from hand held containers with electronic annunciation and/or telemetry of dispensing signals and data.

It is an object of this invention to provide a new and improved methods and apparatus for annunciation of liquid dispensing from discrete containers.

It is an object of this invention to provide a new and improved methods and apparatus for dispensing liquid from an invertible bottle and dispensing head, having new magnetic valving structure and function.

It is an object of this invention to provide a new and improved dispensing methods and apparatus for connection to bottles, having an on-board clock timer and electrically controlled dispensing shut off structure and function.

It is an object of this invention to provide a new and improved methods and apparatus of dispensing wherein a pouring and accounting structure and function is electronically locked to a discrete bottle.

It is an object to provide a new and improved methods and apparatus for dispensing liquor from bottles, with portion control on the bottle, transmission of dispensing dam, and remote recordation and management of the data.

SUMMARY OF THE INVENTION

Methods of dispensing liquid from a bottle have the steps of connecting a head to the bottle, electronically identifying the head and the bottle contents, sensing and recording each dispensing operation, and producing a record of the dispensing operation of each head and liquid.

Beverage dispensing apparatus has a plurality of dispensing heads connectible to discrete bottles, electronic hardware for identifying beverage through each individual head, a remote receiver for receiving dispensing data from each head, and hardware for providing data on each head and beverage.

Methods of dispensing beverage have the steps of connecting a discrete dispensing head to each of a plurality of bottles, reading the bottles and identifying the beverage therein, and electronically programming the head to pour a predetermined quantity of the identified beverage.

Dispensing apparatus has a body with a bottle connector, programmable electronic control hardware on the body, and a data center having structure to electronically program the control hardware.

Methods of dispensing have the steps of connecting discrete heads to bottles, reading each bottle and identifying the beverage therein, electronically coding each head, transmitting identification and dispensing data from each head to a remote data center, and providing a data record for each head and specific beverage.

Beverage dispensing apparatus has a head, electronic identification means in said head, and hardware remote from the head for coding the identification means.

Methods of dispensing liquid from bottles have the steps of connecting heads to bottles, sensing dispensing from each bottle, transmitting radio signals that dispensing has started with an I.D. of the specific head, sensing termination of dispensing, transmitting a second radio signal that dispensing has stopped with an I.D. of the head, and providing a dispensing record of each head.

A beverage dispensing system has individual heads on discrete bottles, each head having radio hardware for identifying the particular head, a remote radio receiver, and hardware connected to the receiver for identifying dispensing for each head.

Methods of dispensing liquid from a bottle have the steps of connecting a head to a bottle, inverting the head and bottle, starting timer hardware in the head, timing the pour from the bottle, signaling when the pour is done, and terminating dispensing in response to the signal.

Liquid dispensing apparatus has a body connectible to a bottle, a valve, a battery, a switch for sensing dispensing, a timer connectible to the battery by the switch, and electromagnetic coil operatively connected to the valve, and a driver controlled by the timer for connecting the coil to the battery to stop dispensing.

Liquid metering apparatus for a bottle has a body, a battery, a timer, a switch, and an annunciator to signal the stop of dispensing while the bottle and connected body are inverted.

Methods of dispensing liquid from a bottle have the steps of inverting a normally upright connected bottle and dispensing head, signalling a timer that the bottle has been inverted, timing the inversion of the bottle, annunciating when a predetermined time has elapsed, and reverting the head and bottle to upright in response to the annunciating.

An annunciator module for a liquid dispenser has a battery, an electrical switch responsive to inversion, a clock for timing inversion, and an annunciator connectible to the battery by the switch and the timer to signal a predetermined time of inversion.

Methods of dispensing liquid from a bottle has the steps of magnetically locking a ferrous valve member to a magnetized valve latch pad in dispensing head secured to a bottle, manually inverting the bottle, and demagnetizing the pad to close the valve and terminate dispensing.

Liquid dispensing apparatus has a body connectible to a bottle, a valve chamber, a ferrous pole piece and ferrous valve in the chamber, a permanent magnet attached to the pole piece, a battery, an electromagnetic coil to neutralize pole piece magnetism, and a switch to connect the battery to the coil to release the valve and stop dispensing.

Methods of dispensing liquid have the steps of latching one magnetic pole of a permanent magnet to a ferrous pole piece, electromagnetically magnetizes the pole piece and repelling the magnet off of the pole piece to change a dispensing valve, re-magnetizing the pole piece, and relatching the magnetic pole to make a second valve change.

A liquid dispensing head has a body with a valve seal, a permanent magnet core, a ferrous pole piece to which one pole of the core is latched, a DC electromagnetic coil for the pole piece, and a dispensing control for electromagnetically de-magnetizing the pole piece causing the valve to move and change state.

Methods of dispensing have the steps of opening a valve, magnetically latching the valve open, dispensing liquid past the latched valve, timing the period of latching, switching DC power to an electromagnetic coil after a predetermined time period, polarizing the coil to neutralize the magnetic latch, and unlatching and closing the valve.

A liquid dispensing head has a body, a valve, a battery, a valve operating structure with a permanent magnet, ferrous piece, and DC coil, a switch and a timer to cause the switch to energize the DC coil and cause the magnet and pole piece to move apart and to rejoin to change dispensing states.

Methods of dispensing have the steps of connecting a dispensing head to a vessel, changing mode in an electrical switch during connecting, recording the switch mode change, dispensing the vessel contents, sensing and communicating dispensing data on the battle contents, removing the head from the vessel, communicating the removal switch change, and producing a log of connecting, dispensing and removal events for the A liquid dispensing head has a body connectible to a vessel, signal structure engageable with the vessel when the body connected to or removed from the vessel, structure for recording connection and removal of the head to/from the vessel, and structure for communicating the connection/removal signal to the recording structure.

BRIEF DESCRIPTION OF THE DRAWINGS

FIG. 5 is a second preferred dispensing head in the method and apparatus of FIG. 1.

FIG. 6 is a view of the head of FIG. 5 inverted;

FIG. 8 is a fourth preferred embodiment of a dispensing head in the method and apparatus of FIG. 1;

FIG. 9 is an isolated view of the radio transmitter module for the dispensing heads of FIGS. 5–8;

FIG. 11 is code pulse train breakdown for the method and apparatus of FIG. 1;

FIG. 12A is a flow chart describing the steps for the method and apparatus of FIG. 1;

FIG. 12B is a wave form chart for FIG. 12A;

DESCRIPTION OF THE PREFERRED EMBODIMENT

Figure 1:
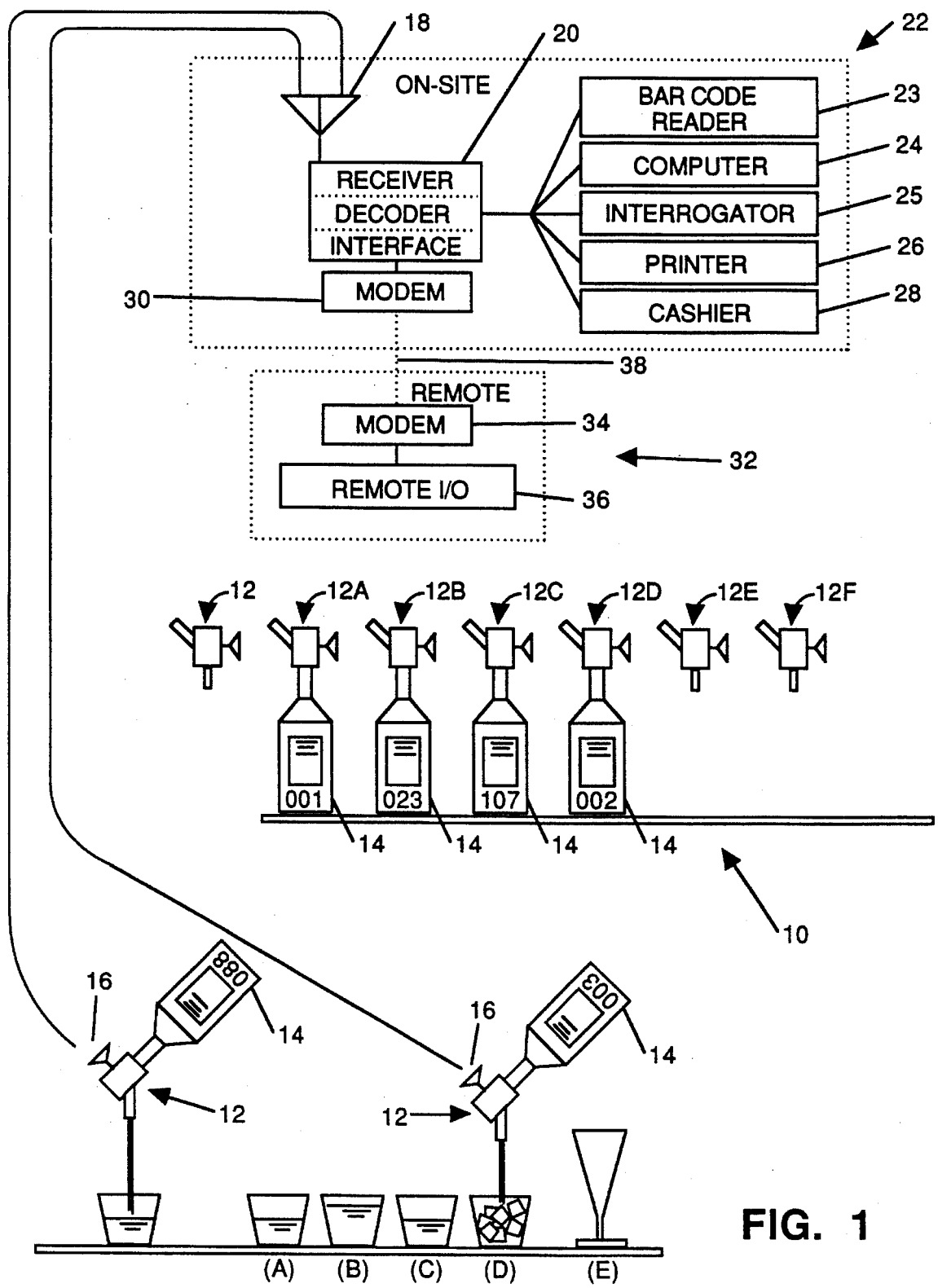
FIG. 1 is a schematic drawing of the preferred embodiment of an electronically controlled liquid dispensing system, for practicing the methods of the present invention.

FIG. 1 is a schematic of the preferred embodiment of the system of the present invention, this liquid dispensing system being generally indicated by the numeral 10 and in the preferred embodiment being for liquor, liqueurs and other high value beverages for human consumption.

The system 10 has at least one and typically a plurality of dispensing heads 12 which are fluid tightly securable to discrete and individual beverage bottles 14. A plurality of operatively adjoined bottles 14 and heads 12 are shown in on-line inventory (on a shelf such as commonly seen in a back bar) awaiting use, and are designated as having beverages 001, 023, 107, and 002. A plurality of heads 12, i.e., three, are shown disconnected from bottles and available for connection to a bottle 14 for future use. A plurality of operatively adjoined heads 12 and bottles 14, designated as having beverages 003, and 088 are shown dispensing simultaneously. It will be appreciated that the tilted or inverted adjoined bottles 14 and heads 12 shown in the inverted pour or dispensing positions are being manually held by a person and that the pour or dispensing is being done manually by the people holding the adjoined bottle 14 and heads 12. A single serving or quantity of beverage 088 is shown being dispensed into a single glass. Typically the dispensing of this single serving will be a single uninterrupted flow from the dispensing head 12. Five glasses are shown being filled with beverage 003, all of these lined-up glasses will typically be filled in a single uninterrupted flow as the bartender fills glasses A–E by moving the adjoined and inverted bottle 14 and flowing dispensing head 12 from one glass to another, i.e. A to B, B to C, C to D, and so forth, without interruption of flow, to speed dispensing up. This type of dispensing is typically done with popular generic bar beverages. Note that glass B has twice as much dispensed beverage as and a higher fill level than the adjacent glasses A & C, and that glass D is being filled and glass E remains to be filled and that glass E is of a different shape and will have a quite different fill level for a given single or multiple unit of beverage. Glass D will also have a visually different fill level because of an uncertain quantity of ice. Each head 12 has an antenna 16 (which may be and preferably is internal and normally not visible) for sending a radio dispensing data signal to a receiver antenna 18 on a remote receiver 20. An on-site dispensing data center 22 includes the receiver 20 with an associated decoder and interface, a bar code reader 23 for reading the product bar code on each bottle 14, and an identification bar code on each head 12, a computer 24 (which will preferably have a keyboard), an interrogator 25 for communicating with the heads 12, a printer 26, and a cashier interface 28. An on-site modem 30 may also be provided.

A remote data management center 32 includes a remote modem 34 and a remote I/O station 36 which is connectable by a communication link 38 to the on-site center 22. The on-site center 22 will include any other desired connection hardware and will typically be in the same building as the heads 12. The remote center 32 may be in the same building, at a remote management office, at the beverage suppliers facility, at an accountants, in several locations, and so forth. The remote center 32 is utilized for business purposes, and may be physically integrated into the on-site center 22 if so desired. There may be a plurality of remote centers 32.

The dispensing head 12 is an important part of this invention and the use of at least four different types of dispensing heads 12 in one or more installations of the system 10 contemplated. The different heads 12A, 12B, 12C, 12D which will hereinafter described, may be used in a combination or in an exclusive arrangement in the system 10. As an example, the system 10 may be exclusive and use only heads 12A, or only heads 12C, and so forth. As a second example, the system 10 may use a combination of two or more, or all of the heads 12 concurrently. As an example, a single system 10 may use heads 12A & 12C, it may use heads 12B and 12C, or it may use heads 12A, 12B, 12C and 12D as well as future heads 12 that are yet to be devised, or which are derivatives of the herein disclosed heads 12.

FIGS. 2–9 show the mechanical and structural features and functions of previously referred to four heads 12A, 12B, 12C, 12D.

Figure 2:
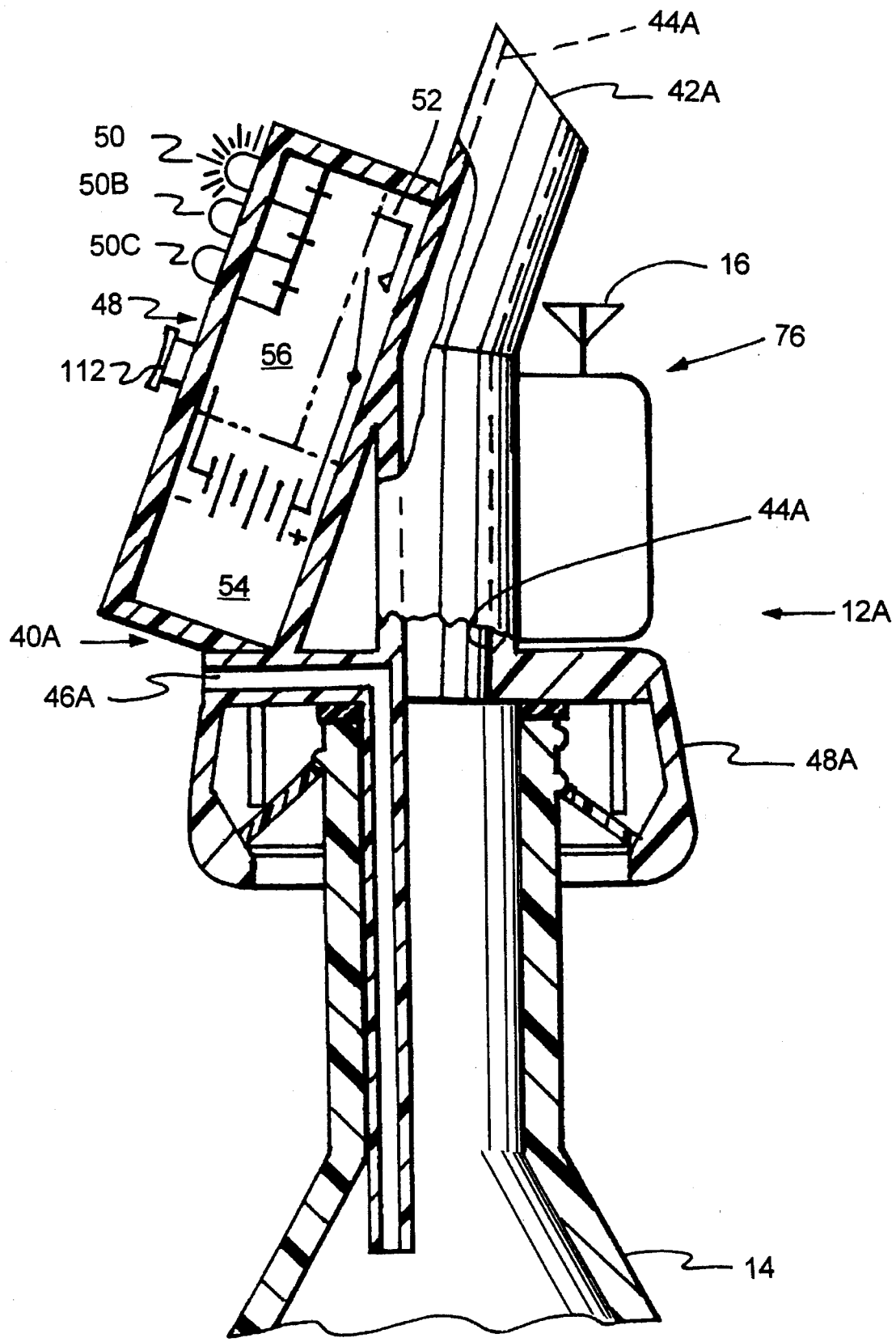
FIG. 2 is a first preferred dispensing head; in partial section, in the method and apparatus of FIG. 1.

FIG. 2 illustrates the first of the dispensing heads 12A in partial cutaway relative to a portion of the bottle 14. Head 12A has a body 40A with a pouring nozzle or spout 42A having an open liquid bore 44A therethrough, an atmospheric air vent 46A, and a fastening structure 48A to secure the head 12A to the bottle 14. This head 12A and the complete fastening structure 48A in particular, is shown and described in my copending Arganious E. Peckels U.S. patent application 477,553 filed on Feb. 9, 1990, now U.S. Pat. No. 5,044,521, the teachings of which are incorporated hereinto by specific reference. It is to be appreciated the fastening structure 48 on any of these heads 12 can be alternative and conventional structure such as is now in common use; a specific example being shown in U.S. Pat. No. 3,321,113. In the head 12A, flow of liquid through the spout 42A is unobstructed and not directly controlled; i.e. the entire bottle 14 can be emptied in a single inversion or pour.

An integral component of this head 12A is an attached electronic dispensing annunciator module 48 having at least one annunciator 50 which is preferably a light emitting diode (LED) 50. The annunciator 50 is normally off and intermittently beeps or blinks on to indicate or annunciate the dispensing and delivery of a specific or repetitively identical volume of liquid, presuming that the bottle 14 has liquid in it. The module 48 includes an attitude sensitive normally off (NO) switch 52, such as a mercury switch or alternatively a normally open (NO) reed switch actuated by a magnet that can slide up and down past the reed switch during attitude change of the bottle 14 and head 12A. The actuator switch 52 is operatively connected to a battery 54 and to an electronic timer 56. In basic operation of the head 12A, the user groups and inverts the adjoined bottle 14 and head 12A to pour liquid. The switch 52 closes upon the inversion and start of pouring, and starts the timer 56. When the timer 56 times out a predetermined time period, the timer 56 provides a control signal to the annunciator 50 which is momentarily enabled to indicate that a specific predetermined volume of liquid has been poured and dispensed. The LED annunciator 50 will blink when enabled; an audio annunciator would beep or buzz.

The module 48 may be provided with a second annunciator 50B and/or a third annunciator 50C which are also preferably LED's. The second LED 50B will also be operatively connected to the timer 56 and is a fractional annunciator 50B to indicate pouring of a fractional, partial, i.e. one-half, volume of liquid from the head 12A. The second annunciator or LED 50B will normally be off, and will blink or beep when enabled. The third annunciator 50C or LED is an anticipation or warning annunciator 50C that warns that the primary annunciator 50 is about to be enabled and the end of the integral time period is near. The single primary annunciator 50 gives very good manual control of the volume of liquid dispensed in integral units of volume, i.e. 1, 2, 3, 4, . . . volumes. The secondary annunciator 50B provides very good manual control of the volume of liquid dispensed in integral and fractional units of volume, i.e. ½, 1, 1½, 2, 2½ . . . volumes. This secondary annunciator 50B structure and function is particularly useful in liquor dispensing where fractional and/or half shots are frequently used for mixed drinks. The third annunciator 50C provides extremely good and repetitive manual control of the dispensing of repetitively identical quantities of liquid. The human user reacts more precisely to the primary annunciator 50 after the third annunciator 50C signal. The timer 56 may be fixed or adjustable; regardless the head 12A provides a very high repeat accuracy from pour to pour. An audible annunciator 50 may be used in place of or in combination with a visual (LED) annunciator 50. If the battery 54 becomes discharged or for some other reason the head 12 becomes inoperative, the annunciator 50 will repetitively blink to indicate the problem.

Figure 3:
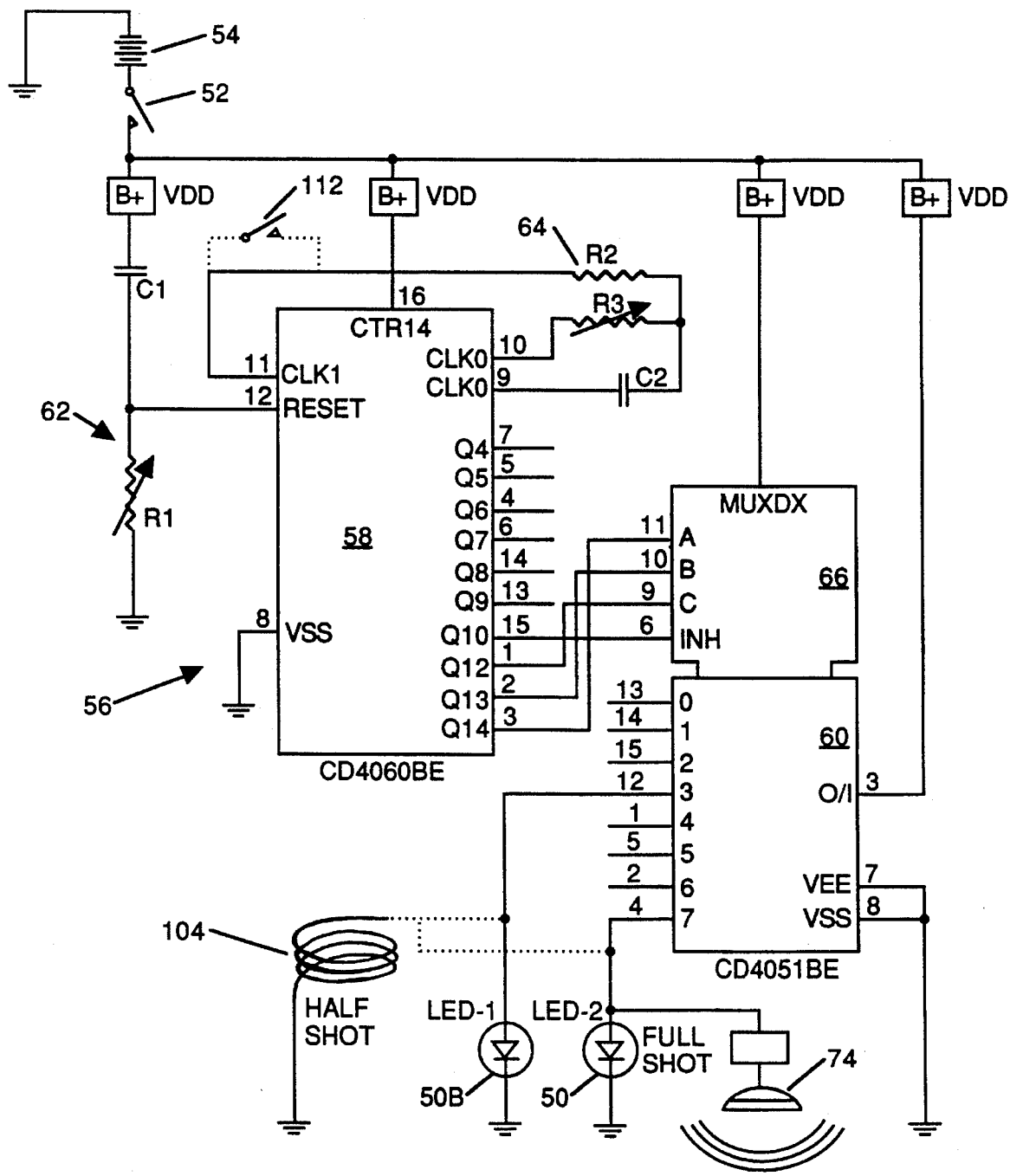
FIG. 3 is a wiring schematic of the dispensing annunciator in the head of FIG. 2.

FIG. 3 is a schematic of the preferred electrical componentry and wiring of the annunciator module 48. The timer 56 includes clock chip 58, which may be a CD4060BE, operatively connectable directly to the battery 54 via the switch 52, and to a CD4051BE dispensing and annunciator control chip 60 which may be a CD4051BE. The switch 52 is connected to the clock chip 58 through an input delay circuit 62 having a capacitor C1 and resistor R1 tap to ground. The delay circuit 62 will provide a typical delay in the way of 300 m sec plus or minus, or up to ½ second in certain embodiments, and may be fixed or adjustable. Typical fixed values are 0.047 of C1 and 10 meg R1, or 0.1 of C1 and 47 meg R1. An alternative variable R1 provides a variable initial delay and complexity. A control time-out circuit 64 is connected between pins 9, 10 & 11 of the clock 58. Capacitor C2 and resistor R3 control the timer frequency; resistor R2 is a bias resistor in the circuit 64.

It is preferably that R3 be adjustable for providing adjustability of the integral unit and fractional unit dispensing timing. Outputs from the clock chip 58 are communicated via a multiplexer 66 to the annunciator control chip 60 which will then at the proper time enable the integral unit annunciator 50, the fractional unit annunciator 50B, and the unshown warning annunciator 50C which would be connected to one of the otherwise unused output pins of annunciator control chip 60. It is preferable that the multiplexer 66 and annunciator control chip 60 be integrated into a single chip such as a CD4051 which is generally referred to as a "1 out of 8 decoder".

Figure 4:
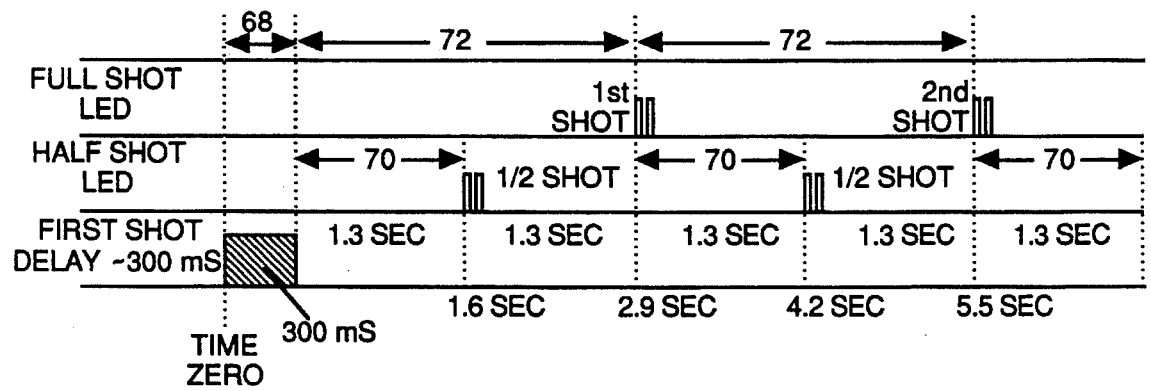
FIG. 4 is a timing chart for the annunciator and head of FIGS. 3 & 4.

FIG. 4 is a representative and typical event timing chart illustrating what happens and how the head 12A operates with the annunciator module 48. Firstly, as the head 12 is inverted and the switch 52 closes, the initial delay period 68 occurs and provides at least two functional operations. If the delay 68 is not completed, it is assumed that the dispense start signal from switch 52 is false and the annunciator module 48 ceases function and resets to relative zero. Upon completion of the delay 68, timing of fractional timed dispensing periods 70 and integral timed dispensing periods 72 continues indefinitely, up to a cumulative time-out termination to be explained later. If an optional audio annunciator 74 is used in combination with the integral unit annunciator 50 and fractional unit annunciator 50B, the audio annunciator 74 beeps only with the integral annunciator 50 enablement. The shown event timing chart will be changed for various and different liquids of different flow characteristics.

The delay period 68 immediately after time zero, allows the flow of liquid through the head 12A to start up and come up to a normal rate. As is apparent, the total time (68 & 72) provided to the first occurring annunciation is longer than the period to subsequent annunciations in a single cycle of pour.

Returning to FIG. 1, lower right portion of the drawing, it will be apparent that this fast head 12A is particularly useful and effective for dispensing of relative high volume average value beverages into receptacles (glasses) of various geometric and/or with various fills of ice cubes or previous beverage mix. As an example, the user (bartender) can fill one unit into glass A, 2 units into glass B, one unit into glass C, a fractional or more unit into ice-cube filled glass D, and a fraction or integral unit into relatively tall slender glass E. The user does not need to rely upon the fill height in the receptacles and does not need to stop and restart between receptacles. The single pour into these lined up receptacles of various size and configuration can be continuous, uninterrupted, fast, least costly, and of consistently repetitive and correct volume. As shown, the head 12A may also have a head antenna 16 and a dispensing head data transmitter module 76 for purposes to be explained.

FIGS. 5 & 6 illustrate the mechanical construction of second type of dispensing head 12B having a body 40B fastened to the bottle, with a spout 42B, a bore 44B extending from the spout 42B into the bottle 14 and air vent 46B into the bottle 14. The bore 44B has an entrance section 78 leading from the bottle 14 to a valve chamber 80. On the downstream side of the valve chamber 80 is an inward facing valve seat 82, and at the upstream side of the valve chamber 80 is a valve pocket or nest 84. The entrance section 78 preferably fluidly adjoins the chamber 80 between the seat 82 and the pocket 84. The pocket 84 has a liquid weir 86 between itself and the entrance section 78 to retain a pool of wetting liquid in the pocket 84. The bottom of the pocket 84 comprises a ferrous pole piece 88 which has a corrosion resistant coating such as chromium or Teflon in the concavity of the pocket 84. Within the chamber 80 is a loose ferrous valve 90, which is preferably a ball and which is normally within the pocket 84 and upon a chamber end head 92 of the pole piece 88. The pole piece 88 is naturally low or non-magnetic and the chamber end head 92 preferably has a tri-pod or valve support and latch pad 94 upon which the valve 90 sits in direct valve 90 to pole piece 88 physical contact. The pole piece 88 is elongate away from the chamber 80 and has a shank 96 extending to an outer end 98.

A polarized permanent magnet 100 is secured directly upon and in physical contact with the pole piece outer end 98. As is shown, one magnet 100 pole end (i.e. North) is upon and in physical contact with the pole piece outer end 98 and therefore the entire pole piece 88 becomes magnetic North and the valve 90 becomes magnetically latched to the pole piece 88, within the pocket 84. Note the valve chamber 80 and valve pocket 84 have some type of a barrier or guide structure 102 to keep the valve 90 out of the entrance section 78 and to direct the valve 90 into the pocket 84 and onto the latch pad 94 when the head 12B is turned upright. As in FIGS. 3, 5 and 6, an electromagnetic coil 104 is wound around the elongate pole piece shank (not shown) and is operatively connected to a normally off and selectively actuatable source of direct current (DC) power in an electronic control module 106 that has a battery 54. It is important that the coil 104 be wound and that the battery 54 be selectively connected to the coil 104 so that the coil 104, when energized always has a coil near end 108 polarity immediately adjacent the chamber end head 88 which is opposite to the polarity implied to the pole piece 88 by the permanent magnet 100. Specifically, if the magnet 100 has North attached to the pole piece 88, the coil end 108 will be South when energized. If the magnet 100 has South attached to the pole piece 88, the coil end 108 will be North when energized. When the bottle 14 and head 12B are upright as shown in FIG. 5, the valve 90 rests upon and is magnetically held and latched in place upon the pole piece 88. The valve seat 82 is normally open (NO) and the entire bore 44B is open.

FIG. 6 illustrates the head 12B in the alterative inverted position for dispensing wherein liquid is pouring out of the bottle 14 through the entrance section 78, through the chamber 80 and valve seat 82, and out of the spout bore 44B. During this dispensing or pour flow of liquid, the valve 90 is held up in the valve pocket 84, latched to the pole piece 88 by the magnetism of the permanent magnet 100 as carried through the pole piece 88 to the valve latch pad 94. When it is time to terminate dispensing, the coil 104 is momentarily activated and the resulting momentary opposite pole electromagnetic field in the coil near end 108 momentarily cancels and neutralizes the permanent magnetic field holding and latching the valve 90 up, whereupon the valve 90 falls off of the inverted pole piece 88 and downward onto the valve seat 82 to obstruct the bore 44B and terminate dispensing from the head 12B. When the bottle 14 and head 12B are returned to the normal head 12B up position, the valve 90 falls by gravity out of the valve seat 82 and back onto the valve latch pad 94 whereupon the valve 90 becomes magnetically relatched to the pole piece 88 and all liquid in the chamber 80 and entrance 78 flows back into the bottle 14, save for a wetting quantity in the valve pocket 84. To intentionally dry the valve pocket 84, a drain port 110 is provided from the pocket 84 to the entrance section 78. Both the pocket 84 and the valve 90 are preferably Teflon coated to eliminate corrosion and/or sticking.

The head 12B also has a data transmitter module 76 and antenna 16 attached to it. The structure and operation of the data transmitter module 76 will be explained later. This valved head 12B is ideally suited for the precise dispensing of single and/or fractional servings of consistently repetitive identical volume. The quantity of the servings is easily adjustable by control of the timing for the energization of the coil 104.

The head 12B may be controlled by the same control module 48 and the same timer 56 that is shown in FIG. 3. The output of pin 7 of the annunciator control chip 60 would be connected directly to the coil 104, and would provide automatic shut off at a complete single unit pour. If the head 12B is to pour fractional units, an option fractional (half-shot) normally open (NO) switch 112 is inserted connecting fractional output pin 3 of the annunciator control chip 60 in parallel with full unit output pin 7, to the coil 104. Either the fractional or integral unit output will then terminate dispensing. Manual closing of the fractional switch 112 effects a fractional unit pour from and shut off of the head 12B. The fractional switch 112 may also be provided in the first head 12A, to provide a fractional annunciation when wanted.

Figure 7:
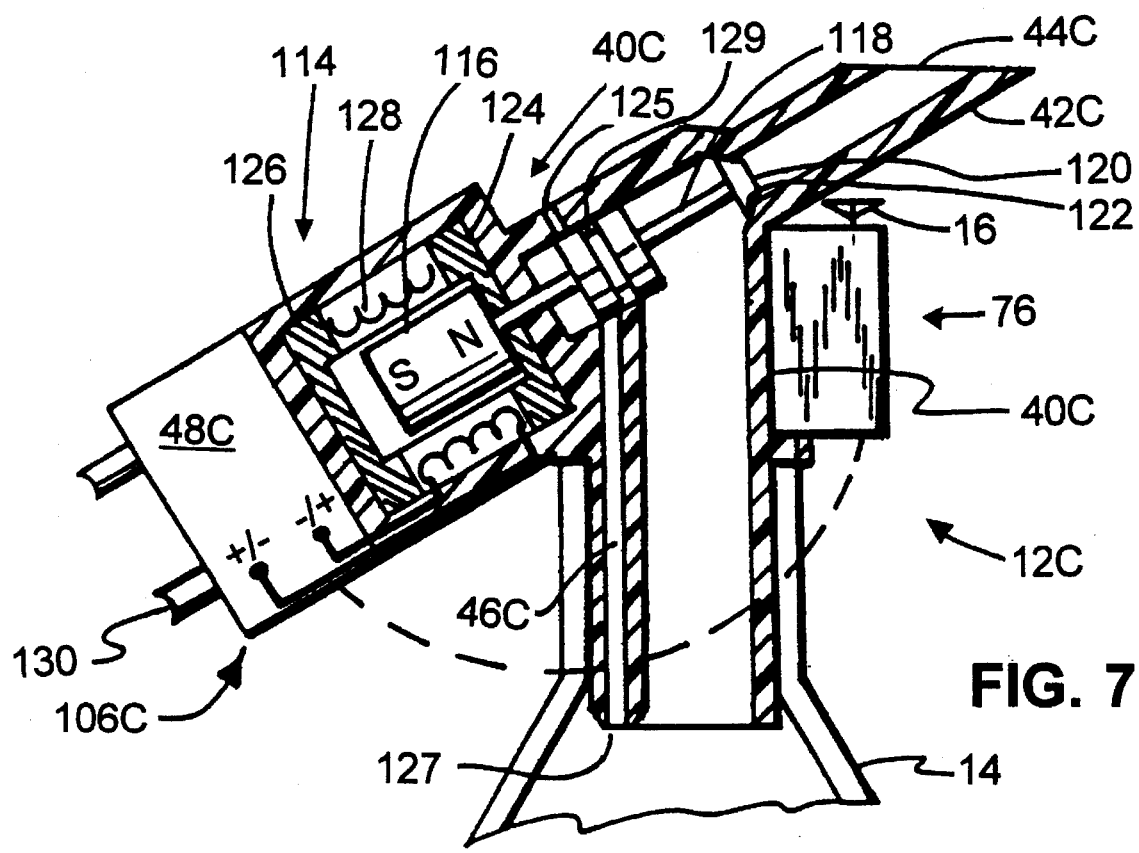
FIG. 7 is a third preferred embodiment of a dispensing head in the method and apparatus of FIG. 1.

FIG. 7 illustrates a third embodiment of a preferred dispensing head, designated as 12C. This head 12C has what we refer to as a schuttle or polar solenoid 114 that has an internal movable permanent magnet core 116 operatively connected by a stem 118 to a valve element 120 which will close a valve seat 122 in the spout 42C of the head body 40C. The polar solenoid 114 has a ferrous near pole plate 124, and a ferrous far pole plate 126, which are one on each end of a central direct current (DC) coil 128 and which are spaced from each other by the coil 128. The coil 128 is electrically connected to the dispensing control module 106C which has essentially the same circuiting as the modules 48, 106 for heads 12, 12B save for unique features to be described. The polar solenoid 114 is bi-stable with the magnetic core 116 in either position and the valve 120 may be in either of a closed (as shown) position, or an alternative open position. The geometry of the valve 120 and seat 122 may also be reversed from what is shown so that the valve 120 moves outward in the spout bore 44C to open for dispensing. When the polar solenoid 114 is in the position shown, the core 116 is magnetically latched to the near pole plate 124. A momentary pulse of DC current, selectively polarized, will cause the solenoid coil 128 to become momentarily magnetized with a North field and causing the near pole plate 124 to be N and the far pole plate 126 to be N, whereupon the magnetic core 116 will jump off of the near pole plate 124 and move towards the far pole plate 126 until the S end of the magnetic core 116 contacts and latches to the far pole plate 126. When the momentary pulse to the coil 128 is terminated, the core 116 remains magnetically latched to the now magnetically neutral far pole plate 126. When it is desired to subsequently have the valve 120 assume the other mode, the control module 106C provides a momentary pulse of relatively reversed polarity of DC to the coil 128 causing a South field whereupon the magnetic core 116 jumps to and latches its N end to the near pole plate 124. This oscillation of the magnetic core 116, stem 118 and valve 120 back and forth occurs during each dispensing cycle of the start, pour and stop steps.

The body 40C has an ambient air vent 46C having a vent inlet 125, a vent outlet 127 inside the bottle 14, and a normally closed (NC) vent valve 129 between the vent inlet 125 and vent outlet 127. The vent valve 129 is structurally secured to the valve stem 118 and is co-movable with the core 116 and the valve 120. The liquid valve 120 and vent valve 129 are both closed at the same time, and are both open at the same time.

The initial start of the pour can be effected by an attitude sensitive switch 52, as is shown in FIG. 2, or by an alternative and similarly wired switch 52C under control of a manual actuator 130 which is preferably a push button. A fractional manual actuator 132, which is also preferably a push button, may also initiate dispensing by operating fractional switch 112 of FIG. 3, as well as the start switch 52C. The pulse to change the mode of the coil 116 and the valve 120 to terminate dispensing will be from either of the integral or fractional output terminals of the control chip 60. This head 12C may also be equipped with the data transmitter module 76 and antenna 16 for purposes to be explained.

FIG. 8 illustrates a fourth preferred embodiment of a manual liquid dispensing head 12D, wherein the head 12D has a body 40D with a spout 42 having an open and unobstructed liquid bore 44D, and an ambient air vent 46. The head 12D has a data transmitter module 76 with an antenna 16, with the transmitter module 76 being activated by means for indicating liquid flow which may be the attitude sensitive switch 52 or which may be other alternative structure such as conductivity probes 132. The head 12D carries its own battery 54. It is to be clearly understood that this head 12D may be without any type of shut off and/or annunciator and is an operative and useful new dispensing head 12D together with the new data transmitter module 76, the structure and operation of which will be subsequently explained. This head 12D may also be equipped with a conventional or novel mechanical volumetric flow control 133, such as that shown and described in Conry U.S. Pat. No. 3,321,113.

An important feature and function that is illustrated in FIG. 8 is a new electromechanical bottle lock, generally indicated by the numeral 134. The bottle lock 134 includes a lock switch 136 that is operatively connected to the data transmitter module 76. The lock switch 136 is preferably a normally open (NO) hermetically sealed reed switch that is mounted in the body 40D. The lock switch 136 is operated by a mechanism 138 having a movable magnet 140 biased toward the bottle 14 by a spring 142. A mechanical bottle probe 144 is secured to the magnet 140 and is also biased by the spring 142 to normally into the position of the bottle 14, and as shown the probe 144 preferably extends out of an annular collar 146 of the body 40 alongside of a tubular bottle connector 147 and outside of a bottle seal 145. The entire plunger mechanism 138 is operatively contained in a lock bore 148. The magnet 140 can be driven by other mechanisms that mechanically sense the connection of a bottle 14 to the head 12D.

In operation of the lock switch 136, the probe 144 normally projects out of the collar 146 and the magnet 140 is alongside the lock switch 136, causing the switch 136 to be in a first mode, preferably open, that indicates the head 12D is not on a bottle 14. When the head 12D is placed upon a bottle 14, the probe 144 physically engages the annular rim around the mouth of the bottle 14, and is pushed into the body 40D and the magnet 140 is moved away from the switch 136, whereupon the switch 136 changes mode, preferably to closed, to indicate the head 14D has been placed upon a bottle 14. When the head 12D is removed from the bottle 14, the probe 144 pops out, the magnet 140 moves away from the switch 136 and the switch 136 changes mode again to NO to indicate the head 12D has been removed from the bottle 14. Each time the lock switch 136 changes modes, the data transmitter module 76 provides out a signal indicating that a bottle connection or dis-connection event has taken place, specifically that the head 12D has been installed or removed to or from a bottle 14.

Although the bottle lock 134 is shown only on the fourth head 12D, this is for purposes of clarity only. The bottle lock 134 is a preferred and highly desirable feature and function that goes with the data transmitter module 76, and the bottle lock 134 is useably installable on all four heads 12, 12B, 12C, 12D as well as other existing and yet to be devised alterative heads 12 of specific structure not herein shown.

Also shown in FIG. 8 is a liquid temperature transducer 149 which is mounted in the liquid bore 44D and preferably quite far upstream in the connector 147 and the liquid inlet. The electronic temperature transducer 149 is operatively connected to the timing clock 58 and the predetermined time periods are automatically extendible for relatively cold slow flowing liquid and compressible for relatively warm faster flowing liquid.

In as much as the bottle lock 134 is particularly useful together with the data transmitter module 76, it is preferable that the bottle lock 76 be integrated into the data transmitter module 76 as shown in FIG. 9. The complete data transmitter module 76, will have a plastic housing 150 within which is the battery 54, the bottle lock 134, the lock switch 136, the magnet 140, spring 142, probe 144 and antenna 16. The data transmitter module 76 also has terminals 152 for connection to the attitude or pour control switch 52, and at least one assembly tab 152 for sonic or other assembly to the head body 40. The data transmitter module 76 can be attached to any of the heads 12, 12B, 12C, 12D with or without the preferred bottle lock 134, and can be connected to other heads, such as Conry U.S. Pat. No. 3,321,113 also. In FIG. 9, the probe 144 and magnet 140 are shown in the alternative positions.

It will be noted there are three (3) basic head bodies 4, specifically the open 40A, 40D (FIG. 2 and FIG. 8), the pole piece 40B (FIGS. 5 & 6), and the polar solenoid 40C (FIG. 7). A volumetric control such as in Conry U.S. Pat. No. 3,321,113 can be operatively secured to the inlet of the open body. It may be that the latter two can be in a single body. A single embodiment of data transmitter module 76 is preferably useable in all of these different heads 12, 12B, 12C, 12D. This data transmitter module 76 may also be used with conventional dispensing heads such as that of Conry U.S. Pat. No. 3,321,113.

Figure 10:
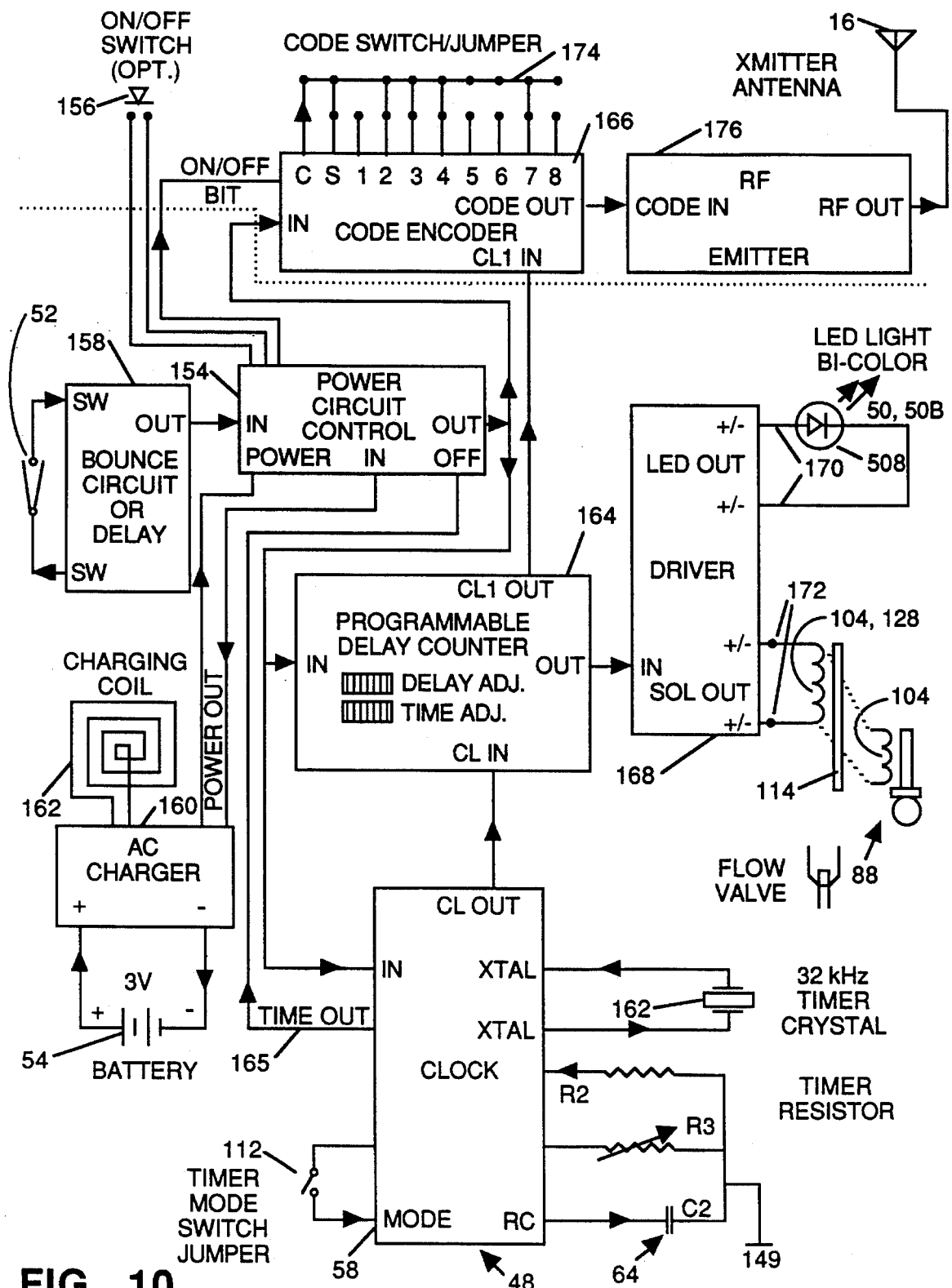
FIG. 10 is a schematic of the electronics in the method and apparatus of FIG. 1, the heads of FIGS. 2, and 5–9 and the module of FIG. 9.

FIG. 10 is a block diagram of the electronics and basic generic componentry for an all inclusive generic electronic module having both the control module 48 and data transmitter module 76 for all of the dispensing heads 12, 12B, 12C, 12D.

The battery 54 is connected to a power control circuit 154 which is under the operative control of either the attitude sensitive switch 52 and/or an independent bottle lock or otherwise operable on/off switch 156. Between the attitude switch 52 and power control circuit 154 is a bounce circuit or delay 158 to prevent false signals or jiggling of the switch 52 to start the circuits. An optional battery charger circuit 160 may have an integrated inductive power coil 162, or may be conventionally connectable to a discrete charge pack (not shown) by a conventional co-axial connector.

The power control circuit 154, when activated by either of the switches 52, 156, provides battery 54 power to the clock chip 58, a programmable delay counter 164, and a code encoder 166. The clock chip 58 is provided with a timer crystal 167, the timer circuit 64, the temperature compensation transducer 149, and the fractional unit switch 112. The programmable delay counter 164 has two adjustments, the first adjustment (such as adjustable resistor R1 in FIG. 3) is for an initial pouring delay to extend the relative time of the first pour (for example an additional 300 m sec), and a second adjustment (such as adjustable resistor R3 in FIG. 3) for varying the relative standard pour time to accommodate different flow rates for various and different viscosity liquids. The outputs from the programmable delay counter 164 go to the code encoder 166 and to a hardware driver 168. The driver 168 has first output terminals 170 connectable (or connected) to the annunciator(s) 50, 50B, and second output terminals 172 connectable (or connected) to either of the solenoid coils 104, 128 for annunciation and/or control of the pour start/stop structure and function. Note that the annunciators 50, 50B can be combined into a single bi-color LED that can be driven by changing polarities from the driver 168 to provide a first color blink for the fractional unit and a second color blink for the integral unit. Note that the driver 168 also provides changing polarity for the polar solenoid coil 128.

The data transmitter module 76 includes the code encoder 166, the bottle lock (on/off) switch 156, a code (jumper) switch 174, a radio frequency (RF) emitter 176 and the RF antenna 16. The encoder 166 receives inputs from the bottle lock switch 156, the tilt switch 52 via the power control circuit 154, from the programmable delay counter 164 and from the clock 58 via a time out circuit 165 that provides a signal accumulative total time has timed out and that all of the liquid has been dispensed and that the bottle 14 is now empty. Output from the encoder 166 is fed to the RF emitter 176 and to the RF antenna 16. It is preferred that the encoder 166 has at least a 12 bit output code and code switch 174. It is contemplated than the RF emitter 176 and RF antenna 16 could be replaced by an erasable ROM unit, whereby dispensing data could be stored and subsequently be transmitted by being read by an electronic interrogator (not shown). The entire structure of both the control module 48 and data transmitter module 76 are on a single high density electronic chip.

FIG. 11 is a schematic of the code pulse train of the data transmitter module 76 for and/or in the heads 12, 12B, 12C, 12D. A preferred pulse train has twelve (12) bits, or more as desired, and time is shown starting at the left and progressing to the right. The spacing to the left of the code train is the time delay imposed by the bounce or delay circuit 158 to be certain that the mode change of the tilt switch 52 is a valid indication of a dispensing pour.

Bit one (1) indicates start of the code train and may have a unique frequency to stand out from the other bits.

Bits two through nine (2–9) provide a digital code to identify the particular head 12 which is having an event. An eight bit identification (ID) code provides for two hundred fifty six (0–255) separate identification numbers for the heads 12; more bits for ID would provide more unique identification capability. Each head 12 has a unique ID code number. This head 12 code will be correlated to the product in the adjoined bottle 14, as will be explained. The illustrated bottle code is shown to be number 078.

Bit ten (10) indicates whether the head 12 is on or off the bottle 14. Bit ten changes state when the head 12 is removed or placed upon a bottle 14 and is effected by the state the lock switch 156.

Bit eleven (11) indicates whether the tilt switch 52 indicates the head 12 is upright (no pour) or inverted (dispensing). Bit eleven changes states as the head 12 is moved between upright and inverted, or vice-versa as the head is moved from inverted to upright, and is initially effected by the state of the tilt switch 52.

Bit twelve (12) indicates the contents of the bottle 14 have been poured out and that the bottle 14 either has liquid in it, or is empty, as will be explained. Bit twelve is originated by a signal in the time out circuit 165 from a cumulative time counter in the clock 58. Additional bits may be used for additional functional designations as necessary and/or desired.

Figure 14:
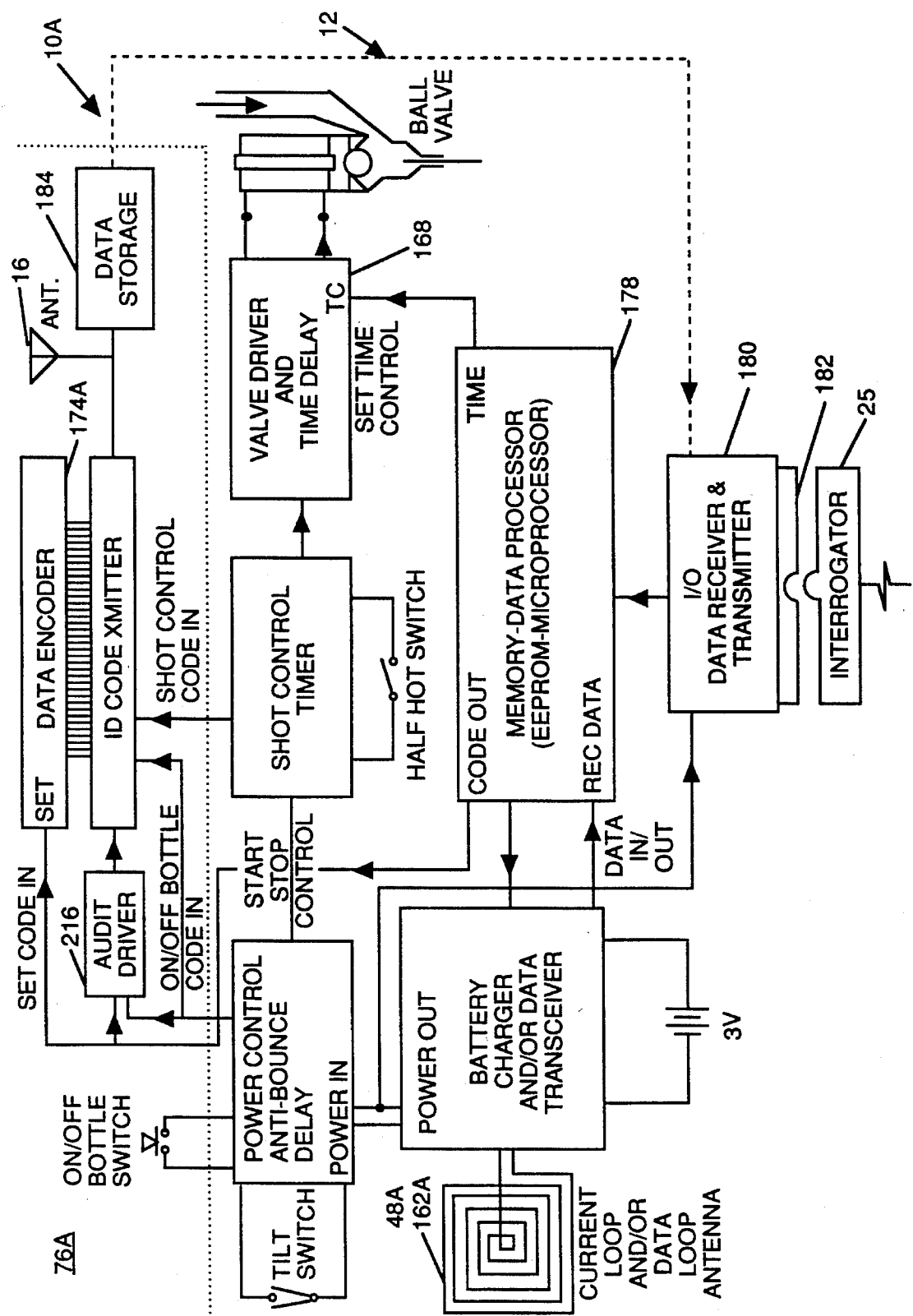
FIG. 14 is a schematic of an alternative preferred dispensing system having programmable heads and alternative historic data transmission.

A specific further function that maybe provided is an audit code effected by an audit driver 216, FIG. 14, causing the transmitter to send out a signal at some nominal quantity of pours, i.e., each 10, 20, 30, 50 pours, etc. This audit signal can be used to establish confidence levels in inventory controls and levels. The audit code will require at least one extra bit in the data code.

A chart of waveforms in FIG. 12B is disposed below FIGS. 11 and 12A and is aligned with FIG. 11. FIGS. 12A and 12B illustrate primary events or phases that any head 12 participates in with one or more bottles 14. Initially in phase one (1) the head 12 is off of the bottle and is electrically quiet because the bottle lock 134 and switch 156 indicate the head 12 is not on a bottle 14 and the electronics are disabled to conserve and minimize usage of battery 54 power and to enable the head 12 to be cleaned and handled without causing spurious signal transmission or false counting of dispensing.

Bit ten of phase two (2) illustrates the digital bottle connections signal for the head 12 being initially placed upon an upright bottle 14; the unique signal change being in bit ten. Note that the head 12 code in bits two through nine identifies head number 078.

Phase three (3) is loading of bottle content code into the computer 24 via a keyboard or the laser bar code reader 23 which is operatively connected to the computer 24.

Phase four (4) is initiation of dispensing due to inversion of the bottle 14 and head 12. Bottle number 078 is identified and bit eleven indicates the head 12 has been inverted and a pour has started.

Phase five (5) is the return of the bottle 14 and head 12 to upright, this being indicated by the state change of bit eleven and indicates termination of dispensing.

Phase six (6) is recording by the computer 24 of the events in states 5 & 6 for the particular head 12 and beverage identified in state two.

Phase seven (7) repeats states 4, 5 & 6 repeatedly, as necessary to dispense all liquid from the particular bottle 14.

Phase eight (8) indicates the bottle 14 is empty, as counted by the clock 58 and signaled by the time-out circuit 165 and the radio module 76. The indication of this event is in the state change of bit twelve.

Phase nine (9) indicates the head 12 has been removed from the bottle 14; by state change of bit ten. Bits eleven and twelve may signal either state in phase (9), depending upon attitude of the bottle 14 and head 12, when the head 12 is removed from the bottle 14.

The head 12 and data transmitter module 76 then loop back to phase one, and the head 12 is readied for subsequent installation upon a new full bottle 14. It is important that the data transmitter module 76 is completely electrically disabled and quiet at all times, except immediately after a data event has occurred and the data event signal is being transmitted. The control module 48 is electrically disabled and quiet at all times, except for during dispensing, to conserve battery 54 power.

It is desirable to have the data transmitter module 76 periodically validate that its battery 54 has an operative charge, and that the head 12 and control module 48 and data transmitter module 76 are properly operable. The data transmitter module 76 can be programmed to periodically (i.e. once a day, during off hours) emit a validation signal that can be interpreted as such by the computer 24. An example of such a validation signal, without utilizing an additional code bit, is two immediately consecutive stop dispense signals that are not preceded by a start pour signal.

Figure 13:
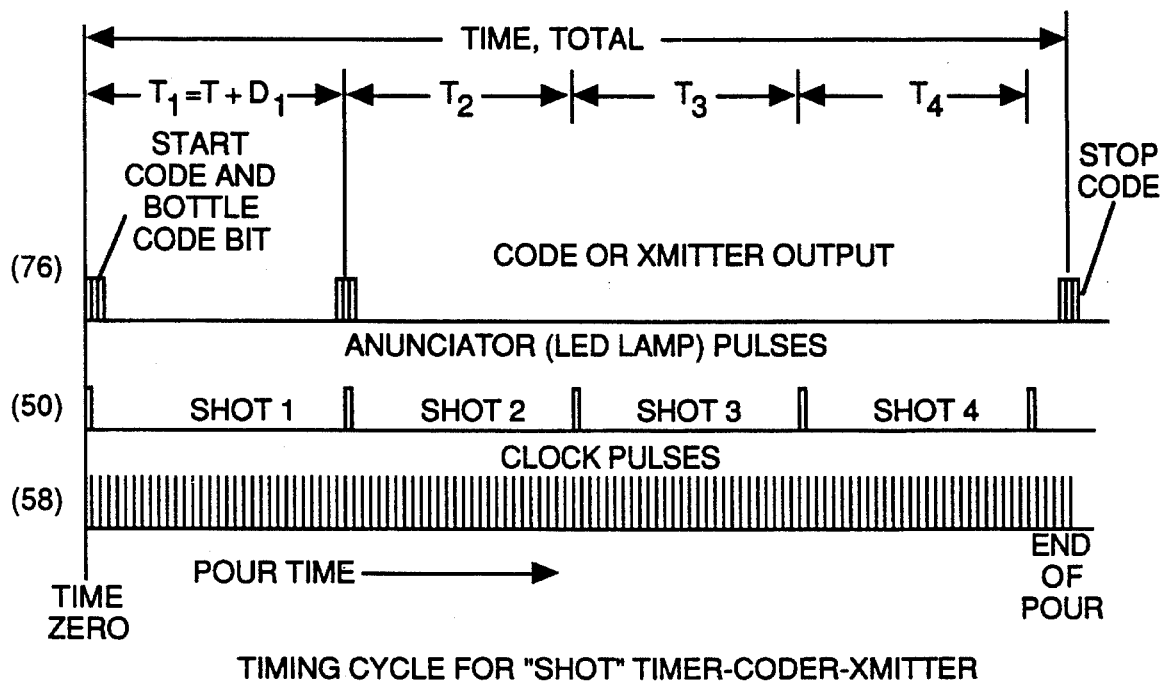
FIG. 13 is a timing chart for a dispensing event in the method and apparatus of FIG. 1.

FIG. 13 is a timing diagram of events in the head 12, dispensing annunciator/control module 48 and the data transmitter module 76 during a dispensing event. Firstly at time zero, the bottle 14 and head 12 are inverted and closing of the tilt switch 52 causes a validated dispensing start signal that feeds through as previously described causing the data transmitter module 76 to provide a start pour code signal pulse as previously described. The data transmitter module 76 then goes silent. Within the control module 48 the clock 58 begins pulsing time periods that are internally counted both the head 12. The computer 24 is also counting the time period with a separate clock structure in the computer 24 The delay circuit 64, and/or delay counter 164 causes an initial time delay at the very beginning of dispensing. The subsequent dispensed units (i.e. shot 2, shot 3, and shot 4) are timed out in identical equal units of X time, specifically $T_2=T_3=T_4=T\ldots=X$ counts. During the dispensing of these subsequent units, the flow rate is relatively constant and therefore the time units are constant. However $T_1$ is longer than $T_2$ because of the relatively slow flow rate at the beginning, therefore $T_1=X+D$, wherein D=the delay time effected by the delay circuit 64 and/or the delay counter 164. There are more total clock pulses in $T_1$ than in the subsequent T periods. If a fractional unit of liquid is being dispensed, i.e. a half-shot, the initial time period will be the fraction plus the delay, i.e. T/2+D in the case of the half-shot.

If the head 12 is of the valved type, specifically, head 12B or 12C, then an automatic shut-off is typically seen at the end of period $T_1$ and such is shown in dotted line on the top event scale. The annunciator 50 enablement is shown in the center event scale and the relative clock pulses are shown in the bottom scale. As shown in the top scale, the dispensing events begin with the emitting of the start pour code. If the head 12 is of the open pour type, specifically 12A or 12D, the pour will continue on and on as shown and may go to four and a fraction units as shown in the central scale, or less, or more as desired by the bartender. If so, the annunciator 50 will be enabled four (4) times to indicate at least four (4) integral units were dispensed. At shut off, the head 12D having the data transmitter module 76, will transmit a stop pour code pulse signal to the receiver 20 and the data transmitter module 76 will then go silent. Upon receipt of the stop pour code signal, the computer 24 will record and/or calculate what XYZ product was dispensed, when it was dispensed, the quantity of XYZ product dispensed, cumulative inventory information, probable gross sales, and other desirable business information using appropriate hardware and software. The clock 58 will keep a cumulative count of liquid dispensed and when the control module 48 calculates that the bottle 14 is empty, a time out (i.e. all liquid has been dispensed) is fed from the clock 58 to the data transmitter module 76 for an "empty" code signal and the head 12 terminates electrical function and shuts down the data transmitter module 76.

As is apparent in FIG. 1, several heads 12 can simultaneously or concurrently pour; and the receiver 20 and computer 24 can handle all of the overlapping dispensing and data. The receiver 20 receives only the event change signals and these are only milliseconds (or less) long for transmission and receipt of the entire data code from each data transmitter module 76.

It is to be understood that not all signals are necessary for every combination of dispensing. The reason being that whereas heads 12A and 12D are free pour, heads 12B and 12C have integral volumetric control, and head 12D may also have optional volumetric control.

Following is a table of the minimum necessary signals for effectiveness of the system 10, at least as presently understood.

| Head | Control Module Signals | Data Module Signals |
| --- | --- | --- |
| Annunciator Head 12A | Finish | Start & Finish |
| Drop Valve Head 12B | Finish | Start & Finish |
| Schuttle Valve Head 12C | Start | A Single Signal |
| Open Data Head 12D | None | Start & Finish |

This new and improved method and apparatus 10 is relatively low cost. A non-rechargeable battery 54 in the head 12 has a cycle life of up to 500,000 units of dispensing, or for the useful life of the head 12. A 5.6 volt lithium battery 54 will provide 5,000,000 blinks of the annunciator 50 LED. This method and apparatus 10 provides for security and accountability in all kinds of liquid and beverage serving establishments, both to the owners and to governmental agencies.

FIG. 14 is an alternative centrally programmable preferred system 10A, wherein the control module 48A is provided with a memory-data micro-processor 178 mini computer such as an 80256 chip, which preferably has an electrically erasable programmable read-only memory (EEPROM), operatively connected to the hardware drive 168 and an electronically adjustable data encoder 174A. The data processor 178 is connected to a data receiver 180 having a data jack 182 which is operatively connectable to the interrogator 25.

The data encoder 174A is normally blank. When the head 12 is mounted upon a bottle 14, the adjoined head 12 and bottle 14 are brought into operative proximity to charging coil 162 or to the interrogator 25 and bar code reader 23 respectively. The bar code reader 23 reads the product bar code on the bottle 14 and an identification bar code on the head 12, if the head 12 is so provided, and this information is fed into the computer 24. The computer 24 in response electronically assigns an identification (I.D.) number to the head 12, correlates this I.D. number with the product in this specific bottle 14, assigns a predetermined nominal dispensing time (T) to the head 12 to correlate to the particular liquid product, and assigns a time delay (TD) for the initial start-up of the pour, for the particular liquid product. The computer 24 has a program and/or all data for flow rates, monetary valves and so forth for all bar coded liquid products to be used with the heads 12. With this alternative system 10A, the heads 12 no longer need a dedicated I.D. number; the heads 12 will be supplied with a relative "zero" out on the encoder 174A and the computer 24 will electronically set the encoder 174A upon loading of the head 12 to the bottle 14. The head 12 may have a data transmitter module 76A with an RF antenna 16 as previously described, or be provided with a dispensing data storage memory 184 which is connected to the data receiver and transmitter 180 and to the data jack 182. The stored historic dispensing information may be subsequently transmitted to the computer 24 via the interrogator 25. An interrogator 25 of electromagnetic or fiber optic type would be appropriate for the system 10A. This system 10A with in-head storage of historic dispensing data, is appropriate where RF transmission is undesirable or not wanted. The in-head storage of dispensing data maybe utilized with either the RF emitter 176, or the interrogator 25, 182. The programmable processor 178 maybe used with either the RF emitter 176 and RF antenna 16, or with the interrogator 25, 182. The inductive charging coil 162A may also be operatively connected to function so a current loop or bi-directional data loop to feed programming material into the microprocessor 178 via an alternative battery charger 160A which may be operatively connected to function as both charger and a data transceiver or solely as a data transceiver. The interrogator 25 would then transmit and receive through the coil 162A and the effective transceiver 160A.

Figure 15:
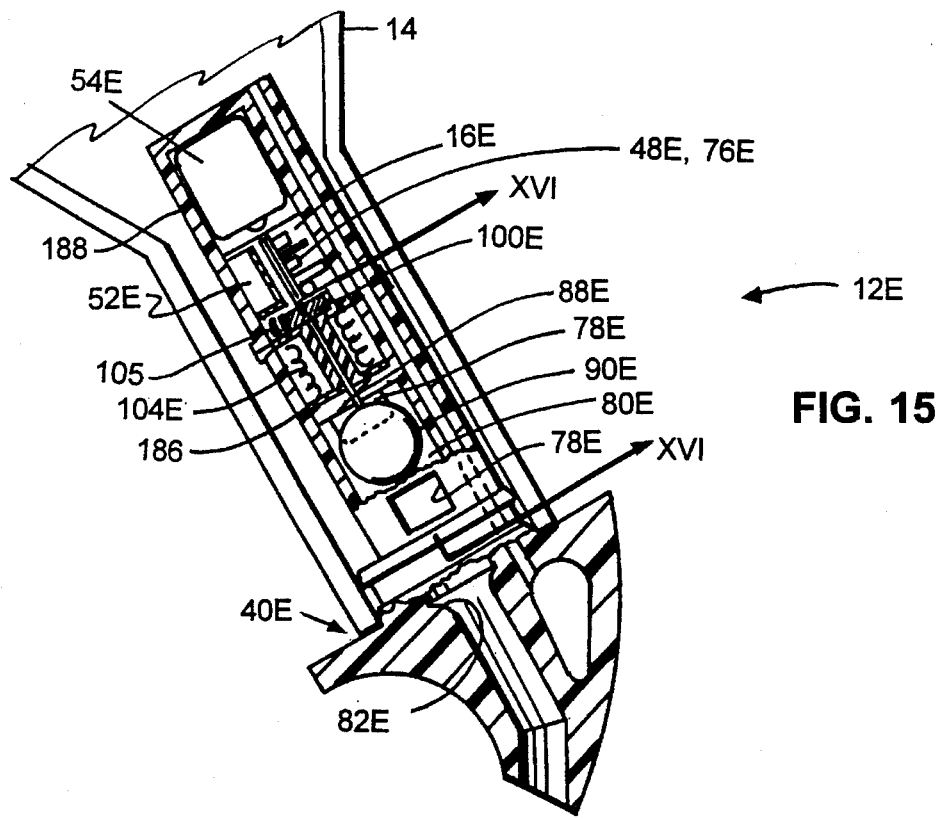
FIG. 15 is a cross-section view of a commercial embodiment of the structure of FIGS. 5 and 6.

FIG. 15 is a cross-section of a production embodiment of a dispensing head 12E based upon the concept shown and described in and with respect to FIGS. 5 and 6. The head 12E is shown embodied in a body 40E somewhat like Conry U.S. Pat. No. 3,321,113. Completely within the body 40E and within the bottle 14, are the ferrous valve 90E, the valve chamber 80E, the valve seat 82E, the liquid inlets 78E, the pole piece 88E, the permanent magnet 100E, the coil 104E, the complete control module 48E and radio module 76E in a single chip, the battery 54E and the start switch 52E. The antenna 16E is with the modules 48E, 76E, inside of the body 40E and the bottle 14. The specific construction of the head 12E is quite ingenious. The valve 90E is placed in the body 40E. The pole piece 88E is embedded and/or sonic welded into a plastic toroid or bobbin 186 and this assembly is pressed into and/or sonic welded in the body 40E to capture the valve 90E. A complete operative assembly of this bobbin 186 and coil 104E, the magnet 100E, modules and antenna 48E, 76E, 16E and battery 54E is secured to the body 40E and operatively the pole piece 88E, and a plastic cap 188 is sonic welded to the body 40 E to hermetically encapsulate the electronics. The head 12E is ready to go with enough battery 54E power for up to 5,000,000 cycles of dispensing. The entire assembly of the coil 104E, modules and antenna 48E, 76E, 16E, and the battery is about 8mm diameter and about 40 mm long. It is very small and is in the body 40E upstream of the valve 90E and valve seat 82E.

Figure 16:
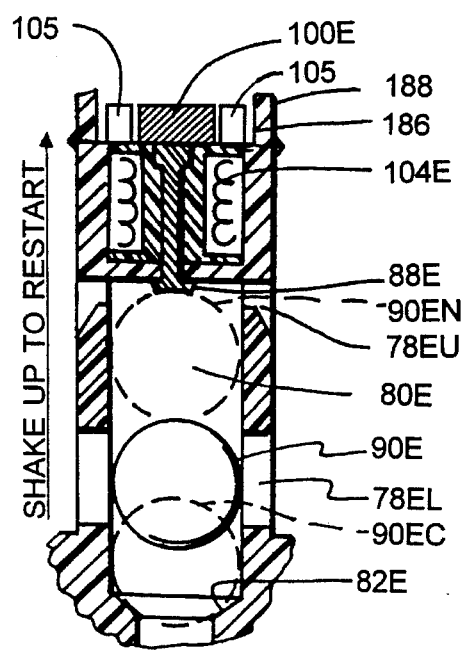
FIG. 16 is a cross-sectional view through lines XVI—XVI of FIG. 15.

FIG. 16 illustrates the valve 90E being dropped from a normal position 90EN magnetically latched to and suspended from the pole piece 88E down to a closed position 90EC on the valve seat 82E. Normal flow of liquid is through lower liquid inlets 78EL and upper liquid inlets 78EV enable a liquid flow on top of the valve 90E to allow the valve 90E to drop freely off of the pole piece 88E and downward through the valve chamber 80E. The upper inlets 78EV also drain liquid back into the bottle 14 when the bottle 14 and head 12E are returned to upright.

The magnet 100E or pole piece 88E are also provided with a flux sensor winding 105 which is operatively connected to the control 48E in parallel with the attitude switch. It has been found that when the head 12E has been inverted and completed its pour, and the ball valve 80E has been dropped, that the entire inverted bottle and head 12E can be vertically shaken to shake the ball valve 80E up on to the pole piece 88E, whereupon the flux sensor 105 will restart the control 48E to do a subsequent timed dispensing cycle without reversion of the bottle and head 12E. This function can also be accomplished with a combination attitude and motion sensing switch in place of the basic attitude switch 52.

Figure 17:
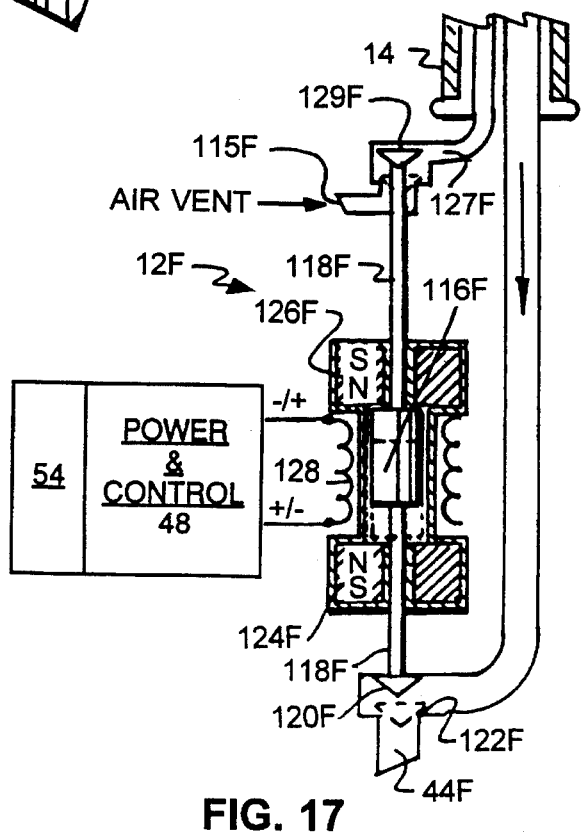
FIG. 17 is a schematic of an alternative preferred embodiment of the dispensing head of FIG. 7.

FIG. 17 is an schematic cross-section of a preferred alternative of a shuttle valve head 12F based upon the concepts shown and discussed in and with respect to FIG. 7. In the head 12F the core 116F is ferrous and non-magnetic. Both of the pole plates 124F, 126F are permanent magnets and have like poles (N, N, shown) facing each other. The coil 128 is wired to the control module 48 and battery 54 so that the coil is momentarily energized with an opposite (i.e. South) field on top to neutralize the N field of pole plate 126F and drop the core 116F to change the state of the valves 120F, 129F. The core 116F then latches to the bottom pole plate 124F. The next energization of the coil 128 provides a like field (N) on top and an opposite field (S) on the bottom that neutralizes the N field of pole plate 124F and pulls the core 116F up to pole plate 126F whereupon it again latches. The valves 120F, 129F are shown opened and closed respectively when down; this operation could be reversed.

Figure 18:
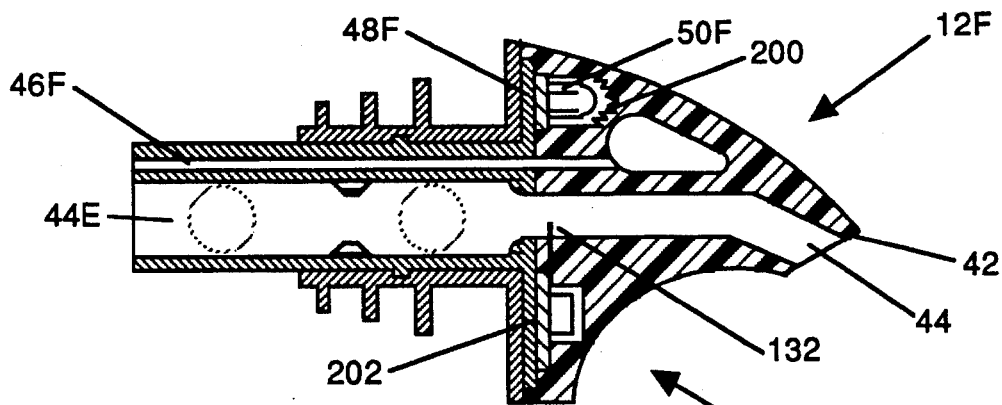
FIG. 18 is a cross-section elevational view though a new and improved dispensing head having an annunciator.
Figure 19:
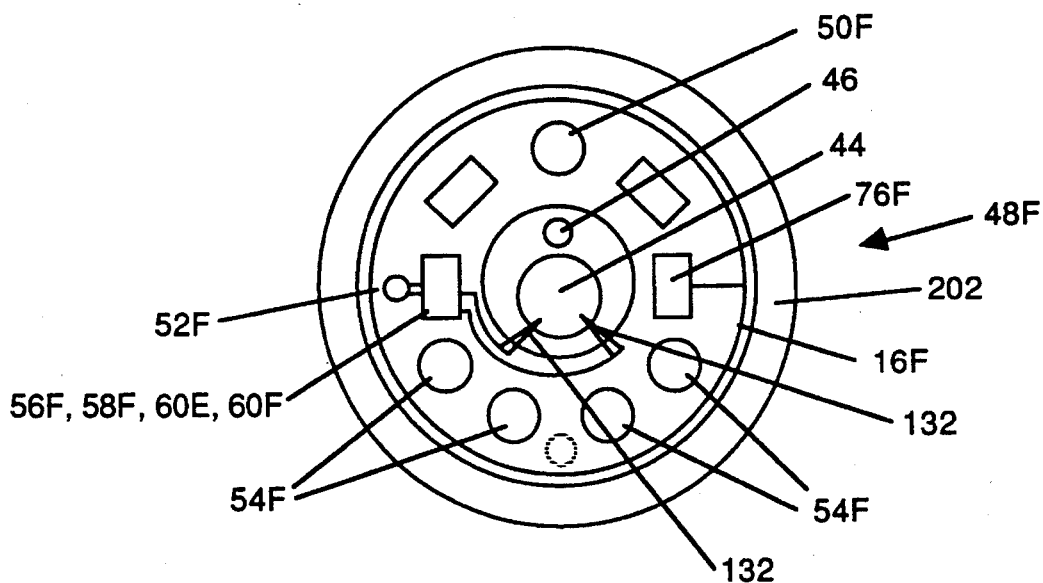
FIG. 19 is an elevational front view of the dispensing control and annuciator in the head of FIG. 18.
Figure 20:
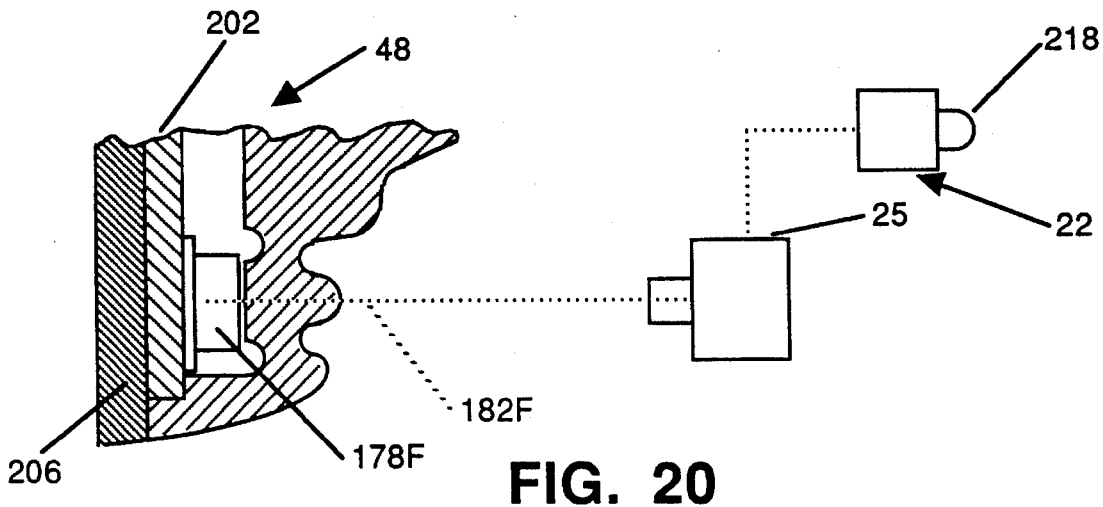
FIG. 20 is a cross sectional view of a further component and function in the head of FIG. 18.

FIGS. 18–19 illustrate, as of this date, the best embodiment of an improved dispenser head 12F having an annunciator. This head 12F has a body 40F which is transparent or translucent and which may be tinted, 1F red, green, etc. From the front to the rear of the body 40F is the liquid bore 44 and the air vent 46, and at the front is the spout 42. The head 12F will have a bottle seal collar as shown, or Applicant's patented connector structure. The first important feature of this head 12F is that the annunciator 50F is inside of the body 40F and positioned to face toward light diffuse structure 200 to cause the annunciator 50F, which is a LED light, to completely light up or illuminate from the inside, the entire body 40F. This is a striking visual effect which can be seen by operator, customer, management, and other patrons. A second important, and distinct, feature of this head 12F is that the entire electronic annunciator and control module 48F is inside of the head 12F and the body 40F, and is hermetically enclosed and sealed within the head 12F. The module 48F has as its structural base an annular, or partial, annular board 202 which is a complete operative subassembly or module 48F, carrying the annunciator 50F, a battery pack of one or more batteries 54F, an attitude sensitive switch 52F, a timer 56F which may be integrated into an electronic clip 58F, 60E and this circuit may have all of the aforementioned features and functions. Further, the module 48F may have a complete radio transmitter module 76F on the board 202, and a printed antenna 16F around the board 202, as shown adjacent the outer perimeter. Passing inside of the board are the liquid bore 44 and air vent 46. One or more electrically conductive liquid probes 132 are also provided on the module 48F, and these probes 132 project into the liquid bore 44 and are operatively converted to the electronic control chip 60F. A further improvement, shown in FIG. 20, is provision of the control chip 60F as an EEPROM 178F with the body 40F having an optional connector 182F for accepting the interrogator and/or programmer 25. The module 48F may thus be programmed on-site, provide data storage, retrieved, and all other functions herein described.

In the new method of making this head 12F, the control module 48F is placed in the body 40F and the aft-section plate (or complete aft section) 206 is welded to the body 40F fluid tightly to hermetically seal the control module 48F in the assembled head 12F.

Anti-pilferage protection can be provided by having a second and remote annunciator 218 either with or without the remote data center 22. The on-head annunciator 50F and remote annunciator 218 operate concurrently, via radio signal transmission.

Figure 21:
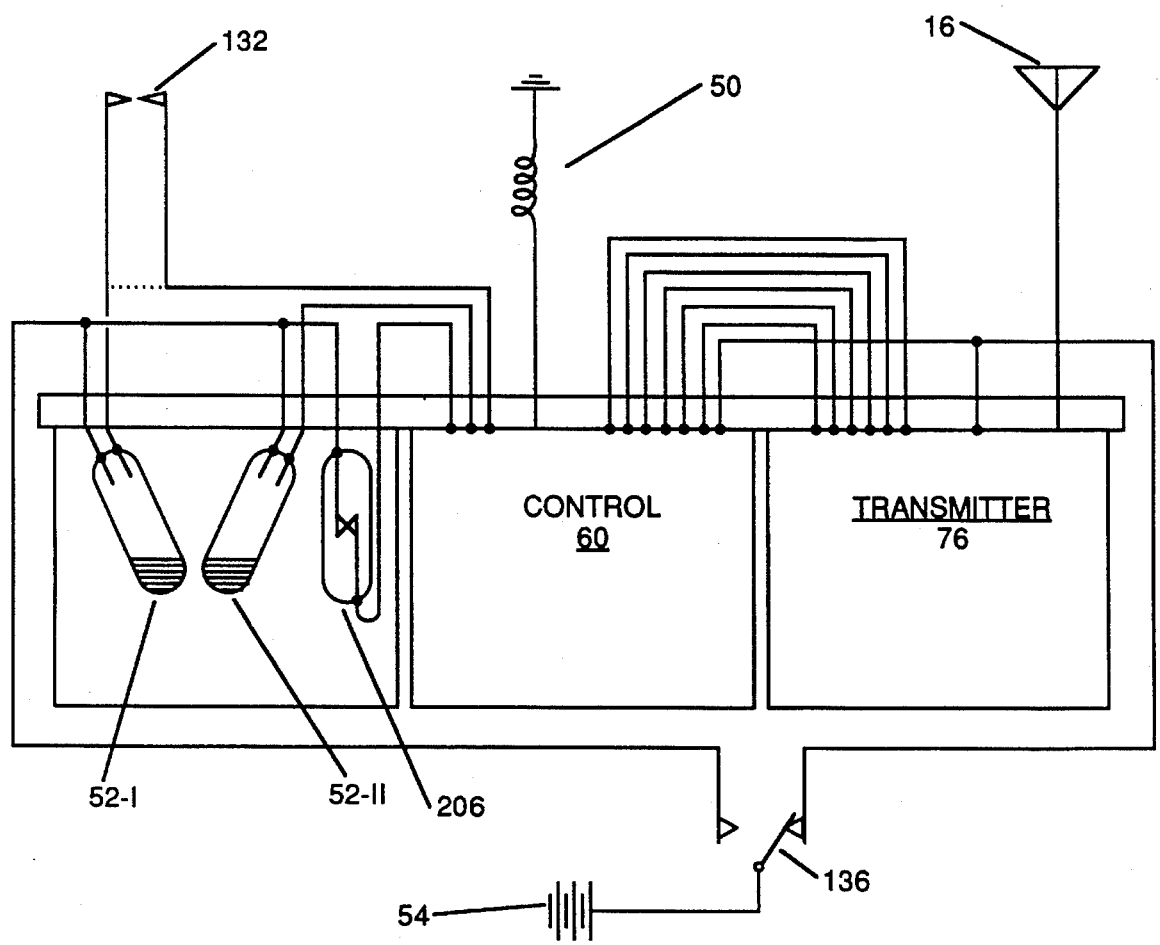
FIG. 21 is an improved actuator switch and control configuration.

In FIG. 21, an improved control system is shown. Two attitude sensitive (Mercury or ball) switches 52-I & 52-II are deployed, either above, or in combination with liquid probes 204 previously described. As the head with this control system is tipped over, one of the attitude switches 52-I, 52-II closes and causes a signal that the head is being inverted, but it may or may not be pouring depending upon the level in the bottle. As the head is further inverted, both switches 52-I, 52-II close and pouring is definite. The probes 204 signal the control 60 only when liquid is present in the spout 42. These various signals from the switches 52-I, 52-11, 204 can be stored and completed to check whether or not dispensing has been proper or if pilferage is taking place. Security switch 206 is magnetically responsive and if a user is attempting to pilfer or cheat with a magnet held to the head 12, the security read switch 206 will respond by signalling the control 60, shutting off dispensing (if possible), and causing a coded pilferage signal to be sent to the data center 22. The various combinations of switches 52-I, 52-II, 204 can be selectively arranged to sequence pour start, timing of quantity, and transmission of the data from the transmitter 76. The double switches 52-I, 52-II are preferably set at angles in the range of 10–30 degrees from the vertical.

Figure 22:
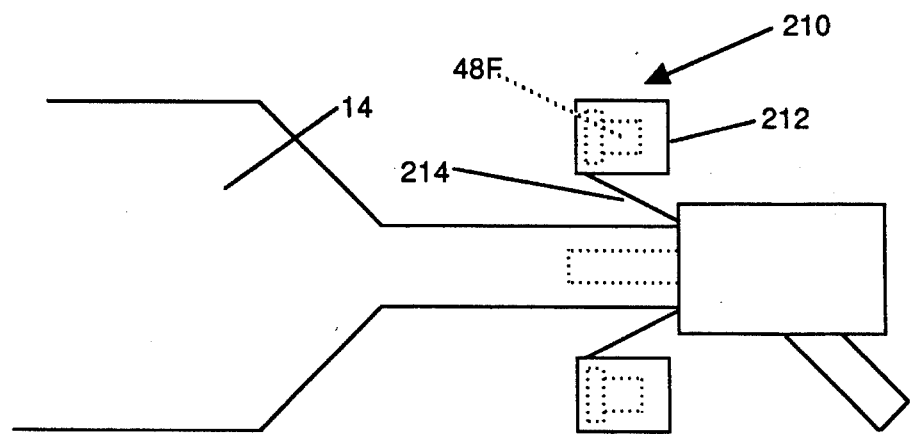
FIG. 22 is a new clip-on retrofit annunciator control.

In FIG. 22, a new clip-on retrofit annunciator control 210 is shown, having a body 212 enclosing a complete control module 48F, and with some type of a snap-on fastener 214 to hold the control 210 onto most any bottle with most any prior dispensing head.

Be it realized that the control module 48F is operative with conventional double ball type dispensing heads, such as are commonly found in beverage establishments wherein position control is featured.

None of the dispensing heads 12A, 12B, 12C, 12D, 12E, 12F are physically connected to or are physically tethered to the data center 22, and all are physically untethered and may be moved around as desired. However, all may be electronically tethered to a relatively intelligent data center 22. These methods and apparatus are economically effective with the least cost beverage in low selling price situations, also with the most expensive beverages in the most expensive price situations. These methods and apparatus may also prove to be very valuable in the transportation industry, inclusive of aircraft, ships, buses, and so forth. The methods and apparatus may also find domestic and/or office acceptance and be effective for prevention of liquor theft by juveniles and/or employees.

Many other advantages, features and additional objects of the present invention will become manifest to those working in or versed in the art upon making reference to and use of the detailed description and accompanying drawings in which the preferred embodiment incorporating the principles of the present inventions are set forth and shown by way of illustrative example.

Although other advantages will be found and realized and various modifications will be suggested by those working in or versed in the art, be it understood that I embody within the scope of the patent hereon, all such embodiments as reasonably and properly come within the scope of my contribution to the art.

I claim as my invention:

1. A method of dispensing a liquid from a bottle of liquid, comprising the steps of (a) magnetically locking a ferrous valve member to a permanently magnetized valve latch pad in a dispensing head secured to the bottle of liquid;

(b) manually inverting the bottle and head and pouring the liquid out of the bottle through the head and past the ferrous valve member; and (c) demagnetizing the valve latch pad with a demagnetizing means dropping the ferrous valve member to close a valve seat in the head while the secured bottle and head are inverted, thereby terminating pouring of liquid from the bottle.

2. A method of dispensing a plurality of predetermined quantities of a liquid from a bottle of liquid, comprising the steps of (a) connecting a pouring head to a bottle of liquid;

(b) inverting the connected head and bottle and pouring the liquid from the bottle and out of the head through a spout;

(c) sensing that pouring of liquid has commenced sensing means;

(d) timing a period of pouring with a timing means;

(e) electromagnetically releasing a magnetically responsive valve from a magnet by a releasing means to close the spout and terminate liquid pouring, upon expiration of the time period, thereby pouring a first predetermined quantity of liquid;

(f) vertically shaking the inverted head and bottle; and causing the valve to move away from the spout of the head;

(g) magnetically latching the valve to the magnet during the vertical shaking of the head and bottle;

(h) electronically sensing that the bottle and head are inverted and that the valve is magnetically latched; and (i) electronically re-staring the timing means to pour a subsequent predetermined quantity of the liquid from the bottle.

3. A method of dispensing a liquid from a bottle of liquid, comprising the steps of (a) connecting a discrete pouring head to the bottle of liquid;

(b) a user manually inverting the connected head and bottle and pouring the liquid from the bottle through the head;

(c) starting timing means in the head for timing pouring upon inversion of the bottle;

(d) timing the pouring with the timing means in the head, the timing means programmed to cause a valve in the head to terminate pouring upon the expiration of a first predetermined time period;

(e) the head signaling to the user completion of at least one intermediate time period with a human perceptible signaling means in the head while the bottle and head remain inverted; and (f) terminating pouring out of the head either by the user manually terminating pouring in response to the signal by righting the bottle or by the timing means actuating the valve in the head terminating pouring at the expiration of the first predetermined time period.

4. The method of claim 3, including the further step of adding a time delay to said at least first predetermined time period, thereby pouring equal volumes of liquid in said at least first and in each subsequent predetermined time period, within a single uninterrupted pour.

5. The method of claim 3, including the further step of varying a successive predetermined time period on successive time periods, thereby improving the relative volumetric accuracy of successive pours from the bottle as the liquid in the bottle is reduced.

6. The method of claim 3, wherein the signaling means is a light and the step of signaling is implemented by lighting an annunciator attached to the head.

7. A method of dispensing a liquid from a normally upright liquid bottle having an adjoined dispensing head, comprising the steps of (a) a user inverting the normally upright liquid bottle and dispensing head, and pouring the liquid out of the bottle through a spout in the dispensing head;

(b) actuating a signaling timer within the head which registers that the bottle and head have been inverted;

(c) timing the inversion of the bottle with the signaling timer which measures both a first predetermined period of time and a second predetermined period of time;

(d) said signal timer actuating an annunciator on the dispensing head which indicates when the first predetermined unit of time has elapsed; and (e) terminating pouring either by (i) the user reverting the dispensing head and bottle to the normally upright position and thereby terminating the pouring after the annunciator indicates the first predetermined unit of time or (ii) the dispensing head terminating pouring when the second predetermined time period has elapsed, whereby one of at least two predetermined volumes of liquid is poured from the bottle.

* * * * *